United States Patent
Rhynard et al.

(10) Patent No.: US 11,987,342 B2
(45) Date of Patent: May 21, 2024

(54) AIRCRAFT CREW EGRESS HATCH ASSEMBLY, SYSTEM, AND METHOD

(71) Applicant: The Boeing Company, Chicago, IL (US)

(72) Inventors: Steven Ellis Rhynard, Mukilteo, WA (US); Joe Files, Arlington, WA (US); Randall Vincent Fraker, Everett, WA (US); Andrew P. Keleher, Bothell, WA (US); Thomas Leonard LeBlanc, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/517,917

(22) Filed: Nov. 3, 2021

(65) Prior Publication Data

US 2023/0140351 A1 May 4, 2023

(51) Int. Cl.
*B64D 11/00* (2006.01)
*B64C 1/14* (2006.01)

(52) U.S. Cl.
CPC ............ *B64C 1/1407* (2013.01); *B64D 11/00* (2013.01)

(58) Field of Classification Search
CPC .......... B64D 2011/0076; B64D 11/003; B64D 25/08; B64C 1/1446; B64C 1/1461; B64C 1/1423; E05C 17/36; Y10T 24/314; Y10T 24/316; Y10T 24/318; E05Y 2201/644
USPC ........................................ 114/201 R; 49/141
See application file for complete search history.

(56) References Cited

U.S. PATENT DOCUMENTS

| | | | | |
|---|---|---|---|---|
| 1,756,506 | A * | 4/1930 | Stafford | A43C 11/14 428/7 |
| 3,316,600 | A * | 5/1967 | Latta | A43C 11/22 24/301 |
| 6,003,813 | A * | 12/1999 | Wentland | B64D 25/08 244/137.2 |
| 6,986,485 | B2 * | 1/2006 | Farnsworth | B64D 11/00 244/129.6 |
| 8,328,137 | B2 * | 12/2012 | Sutthoff | B64C 1/1446 244/129.5 |
| 9,340,294 | B1 * | 5/2016 | Keleher | B64C 1/1407 |
| 10,314,285 | B1 * | 6/2019 | Ursescu | A01K 1/0272 |

(Continued)

FOREIGN PATENT DOCUMENTS

CA    3141938 A1    1/2021
JP    60240595 A *  11/1985

OTHER PUBLICATIONS

"Special Conditions: Boeing Commercial Airplanes Moduel 777-9 Airplane; Overhead Flightcrew Rest Compartment Occupiable During Taxi, Takeoff, and Landing," Dec. 17, 2020, FAA (Year: 2020).*

(Continued)

*Primary Examiner* — Joshua J Michener
*Assistant Examiner* — Ryan Andrew Yankey
(74) *Attorney, Agent, or Firm* — COATS & BENNETT, PLLC

(57) ABSTRACT

Crew egress pathways and crew egress pathway exits in aircraft, with the crew egress pathway exits comprising apparatuses, systems, and methods for reliable deployment and stowage of support straps within crew egress pathway exit hatches positioned, with crew egress pathway exit hatches configured to deploy within aircraft passenger compartments in aircraft.

17 Claims, 20 Drawing Sheets

(56) References Cited

U.S. PATENT DOCUMENTS

| | | | |
|---|---|---|---|
| 2002/0190531 A1* | 12/2002 | Holton .................. | E05C 17/042 292/288 |
| 2003/0233739 A1* | 12/2003 | Coffey ..................... | A45F 5/02 24/302 |
| 2015/0284981 A1* | 10/2015 | Plude ................... | B64C 1/1446 16/58 |
| 2019/0329891 A1 | 10/2019 | Bonnefoy et al. | |
| 2020/0181959 A1* | 6/2020 | Beard ..................... | E05C 17/36 |

OTHER PUBLICATIONS

Brook Sabin, "The secret escape hatch flight attendants use on commercial aircraft," Feb. 24, 2020, Stuff (Year: 2020).*
EP Search Report dated Mar. 7, 2023 in re EP Application No. 22205290.4.

* cited by examiner

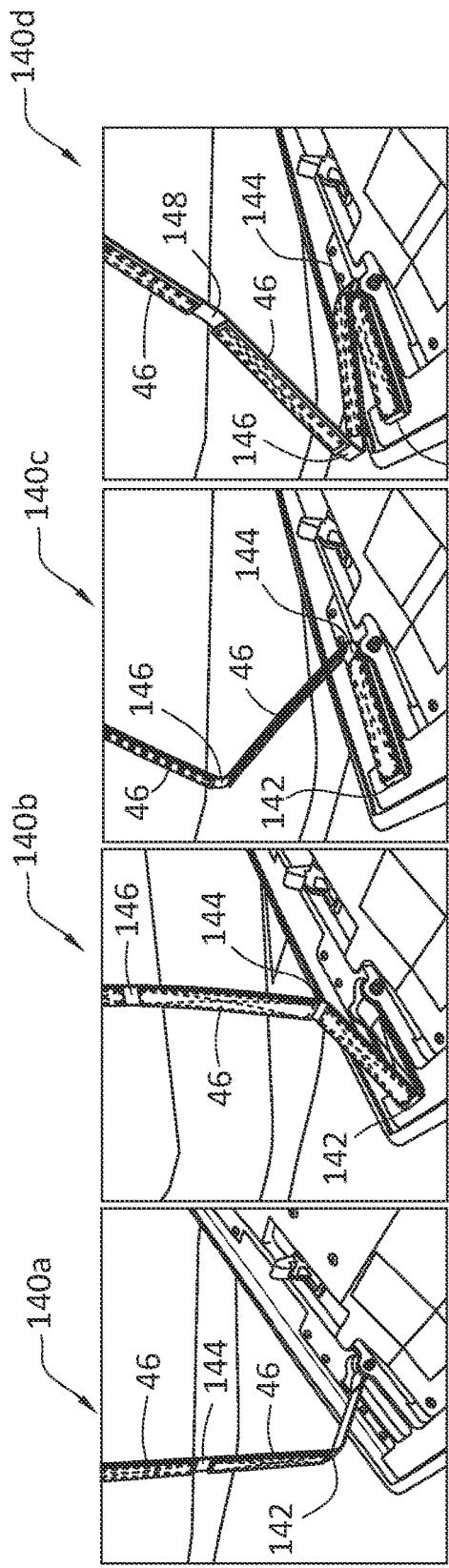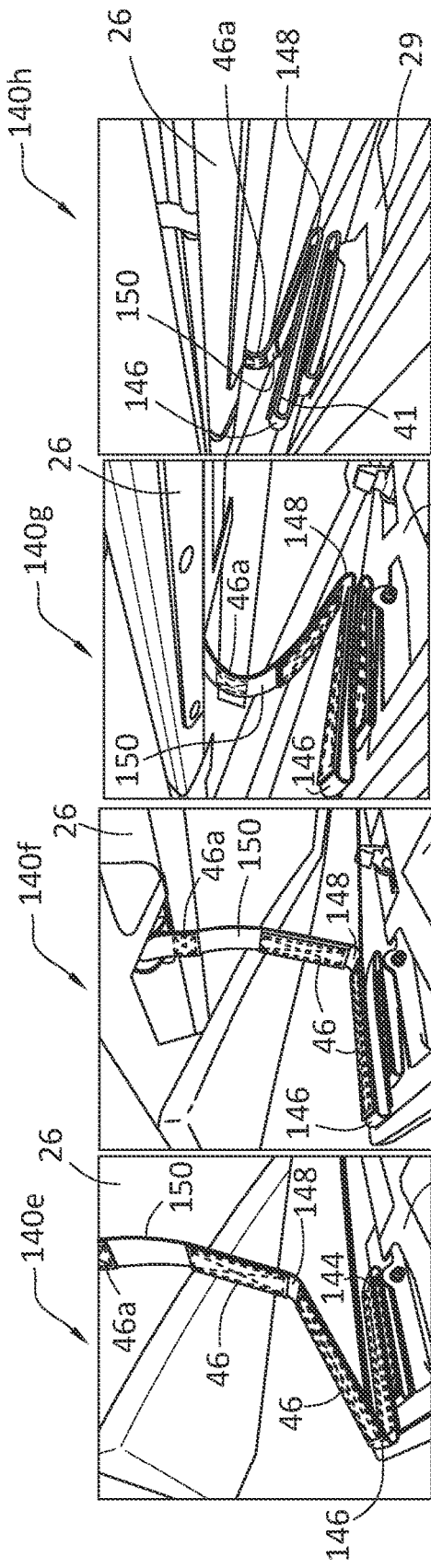

AIRCRAFT CREW EGRESS HATCH ASSEMBLY, SYSTEM, AND METHOD

TECHNOLOGICAL FIELD

The present disclosure relates generally to the field of aircraft design. More specifically the present disclosure relates to the field of crew egress pathways and crew egress hatch assemblies.

BACKGROUND

Aircraft, including commercial aircraft, can be crewed by personnel for which rest periods and breaks may be mandated or desired, particularly on flights of long duration. Accordingly, aircraft design may incorporate rest areas for crew, with such rest areas being contiguous or otherwise in communication with an attendant area or other area within a passenger compartment or passenger cabin, for example.

Unless explicitly identified as such, no statement herein is admitted as prior art merely by its inclusion in the Technological Field and/or Background section.

SUMMARY

Present aspects are directed to the placement of crew egress pathway exits at the terminus of a crew egress pathways for aircraft crew and personnel, and aircraft crew egress pathways terminating at a crew egress exit and crew egress exit assembly that is configured to support the weight of a crew member with the crew egress pathway exit and crew egress pathway exit assembly opening from a closed stowed position (equivalently referred to herein as a "stowed state") to an open deployed position (equivalently referred to herein as a "deployed state"), with the crew egress pathway exit assembly opening into an aircraft cabin such as, for example, an aircraft passenger cabin.

According to a present aspect, a crew egress pathway exit is disclosed with the crew egress pathway exit including a crew egress pathway exit assembly, said crew egress pathway exit assembly including an exit hatch support structure at a crew egress pathway exit, with the crew egress pathway exit in communication with a crew egress pathway. The crew egress pathway further includes a movable exit hatch, said movable exit hatch in movable communication with the exit hatch support structure, and at least one support strap in communication with the exit hatch support structure. The at least one support strap is further in communication with the movable exit hatch, with the support strap including a support strap first end and a support strap second end, said support strap first end fixedly attached to the exit hatch support structure, said support strap second end fixed attached to the movable exit hatch, said at least one support strap comprising a plurality of support strap first sections, at least two of the plurality of the support strap first sections adjoining an adjacent support strap second section, said support strap second section interposed between two of the plurality of support strap first sections. The movable exit hatch is in movable communication with the exit hatch support structure, with the movable exit hatch configured to move through a range of motion from a stowed position with the movable exit hatch in a closed position with the movable exit hatch in substantial contact with the exit hatch support structure to a deployed position with the movable exit hatch in an open position with the movable exit hatch at least partially disengaged from the exit hatch support structure. During moving the movable exit hatch from the deployed position to the stowed position the at least one support strap is configured to fold to form at least one folded support strap, with the at least one folded support strap configured to occupy a predetermined folded support strap footprint. Further, during moving the movable exit hatch from the deployed position to the stowed position the at least one support strap is further configured to fold at predetermined positions along the length of the at least one support strap to form the at least one folded support strap, with the support strap second section comprising a second bending stiffness and the plurality of support strap first sections each comprise a first bending stiffness, with the first bending stiffness differing from the second bending stiffness.

In another aspect, the at least one support strap is configured to fold and form at least one folded support strap, with the at least one folded support strap configured to remain within or otherwise occupy the predetermined folded support strap footprint, with the at least one folded support strap further configured to facilitate intimate contact of a movable exit hatch with the exit hatch support structure in the closed position.

In another aspect, the second bending stiffness is less than the first bending stiffness.

In a further aspect, the plurality of support strap first sections are made from nylon In a further aspect, the plurality of support strap first sections are made from a material comprising at least one of: nylon, cloth, plastic, metal, and combinations thereof.

In another aspect, the support strap second section is made from nylon.

In another aspect, the support strap second section is made from a material comprising at least one of: nylon, cloth, plastic, metal, and combinations thereof.

In another aspect, the crew egress pathway exit comprises a crew egress pathway exit hatch assembly.

In another aspect, the exit hatch support structure is positioned proximate to an overhead storage bin assembly in an aircraft passenger cabin.

In another aspect, the crew egress pathway exit assembly comprises the exit hatch support structure.

In another aspect, the at least one support strap in the unfolded deployed position comprises a tensile strength sufficient to support a weight up to 500 lbs.

In another aspect, the support strap second section defines a flexible joint in the at least one support strap, said flexible joint operable about an axis of rotation.

In another aspect, the at least one support strap comprises a plurality of flexible joints along a length of the at least one support strap, said plurality of flexible joints configured (e.g., induced) to each rotate about an opposite axis of rotation relative to each prior and subsequent flexible joint.

A further present aspect discloses an aircraft, with the aircraft including an aircraft cabin, and with the aircraft cabin including a crew egress pathway exit, with the crew egress pathway exit in communication with a crew egress pathway. The crew egress pathway exit includes an exit hatch support structure, and a movable exit hatch, with the movable exit hatch in movable communication with the movable exit hatch support structure, and at least one support strap in communication with the exit hatch support structure, with the at least one support strap further in communication with the movable exit hatch. The support strap includes a support strap first end and a support strap second end, with the support strap first end fixedly attached to the exit hatch support structure, with the support strap second end fixed attached to the movable exit hatch, with the at least one support strap comprising a plurality of support strap first sections, at least two of the plurality of the support strap first sections adjoining an adjacent support strap second section, and with the support strap second section interposed between two of the plurality of support strap first sections. The movable exit hatch is in movable communication with the exit hatch support structure, with the movable exit hatch configured to move through a range of motion from a stowed position, with the movable exit hatch in a closed position and with the movable exit hatch in substantial contact with the exit hatch support structure in the closed position, to a deployed position with the movable exit hatch in an open position with the movable exit hatch at least partially disengaged from the exit hatch support structure in the open position. During moving the movable exit hatch from the deployed position to the stowed position the at least one support strap is configured to fold to form a folded support strap, with the folded support strap configured to occupy a predetermined folded support strap footprint. During moving the movable exit hatch from the deployed position to the stowed position the at least one support strap is further configured to fold at predetermined positions along the length of the at least one support strap, with the support strap second section comprising a second bending stiffness and the plurality of support strap first sections each comprising a first bending stiffness, with the first bending stiffness differing from the second bending stiffness.

In another aspect, the second bending stiffness is less than the first bending stiffness.

In a further aspect, the plurality of support strap first sections are made from a material comprising at least one of: cloth, plastic; metal, and combinations thereof, and the support strap second section is made from a material comprising at least one of: cloth, plastic; metal, and combinations thereof.

In another aspect, an adjoining support strap first section and an adjoining support strap second section together define a plurality of flexible joints along a length of the at least one support strap, said plurality of flexible joints operable about an axis of rotation, said plurality of flexible joints induced to each rotate about an opposite axis of rotation relative to each prior and subsequent flexible joint.

In another aspect, the movable exit hatch is configured to open into an aircraft passenger cabin when the movable exit hatch is in the open position.

In another aspect, the exit hatch support structure is positioned proximate to an overhead storage bin assembly in an aircraft passenger cabin.

In a further aspect, the at least one support strap in the unfolded deployed position comprises a tensile strength sufficient to support a weight up to 500 lbs.

In another present aspect, methods are disclosed, with the methods including providing a crew egress pathway in an aircraft, said crew egress pathway comprising a crew egress pathway exit, with the crew egress pathway exit comprising an exit hatch support structure, with the crew egress pathway exit further comprising a movable exit hatch, and with the movable exit hatch in movable communication with the exit hatch support structure. The method further includes providing at least one support strap in communication with the exit hatch support structure, with the at least one support strap further in communication with the movable exit hatch, with the support strap including a support strap first end and a support strap second end, with the support strap first end fixedly attached to the exit hatch support structure, with the support strap second end fixed attached to the movable exit hatch, with the at least one support strap comprising a plurality of support strap first sections. According to the method, at least two of the plurality of the support strap first sections adjoin an adjacent support strap second section, with the support strap second section interposed between two of the plurality of support strap first sections. The method further includes moving the movable exit hatch from a stowed position to a deployed position, with the movable exit hatch in movable communication with the exit hatch support structure, with the movable exit hatch configured to move through a range of motion from a stowed position with the movable exit hatch in a closed position and in substantial contact with the exit hatch support structure to a deployed position with the movable exit hatch in an open position with the movable exit hatch partially disengaged from the exit hatch support structure. The method further includes expanding the at least one support strap from a folded state in the stowed position to an unfolded state in the deployed position, applying a force to the movable exit hatch in the deployed position, with the force configured to move the movable exit hatch from the deployed position to the stowed position, directing the at least one support strap from the unfolded deployed state to the folded stowed state, folding the at least one support strap at predetermined positions along the length of the at least one support strap to form a folded support strap, with the support strap second section including a second bending stiffness, and the plurality of support strap first sections each including a first bending stiffness.

In another aspect, the crew egress pathway originates at a crew rest area, with the crew egress pathway terminating at the crew egress pathway assembly positioned within an aircraft passenger cabin.

In another aspect, the second bending stiffness is less than the first bending stiffness.

In a further aspect, a method further includes defining a flexible joint at the support strap second section in the at least one support strap, said flexible joint operable about an axis of rotation.

In another aspect, a method further includes providing a plurality of flexible joints along a length of the at least one support strap, and inducing sequential flexible joints to each rotate about an opposite axis of rotation, with the opposite axis of rotation observed relative to each prior and subsequent flexible joint.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
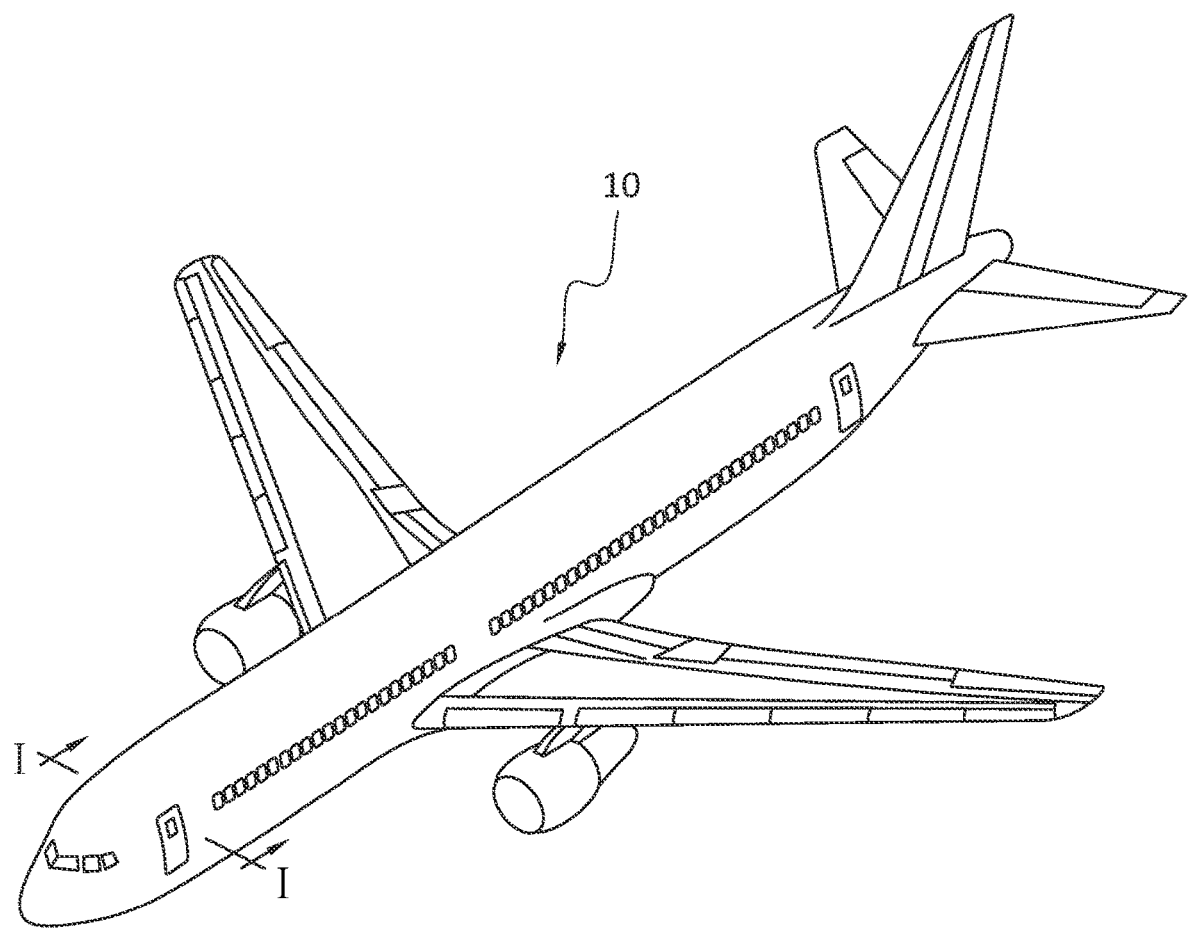
Figure 2:
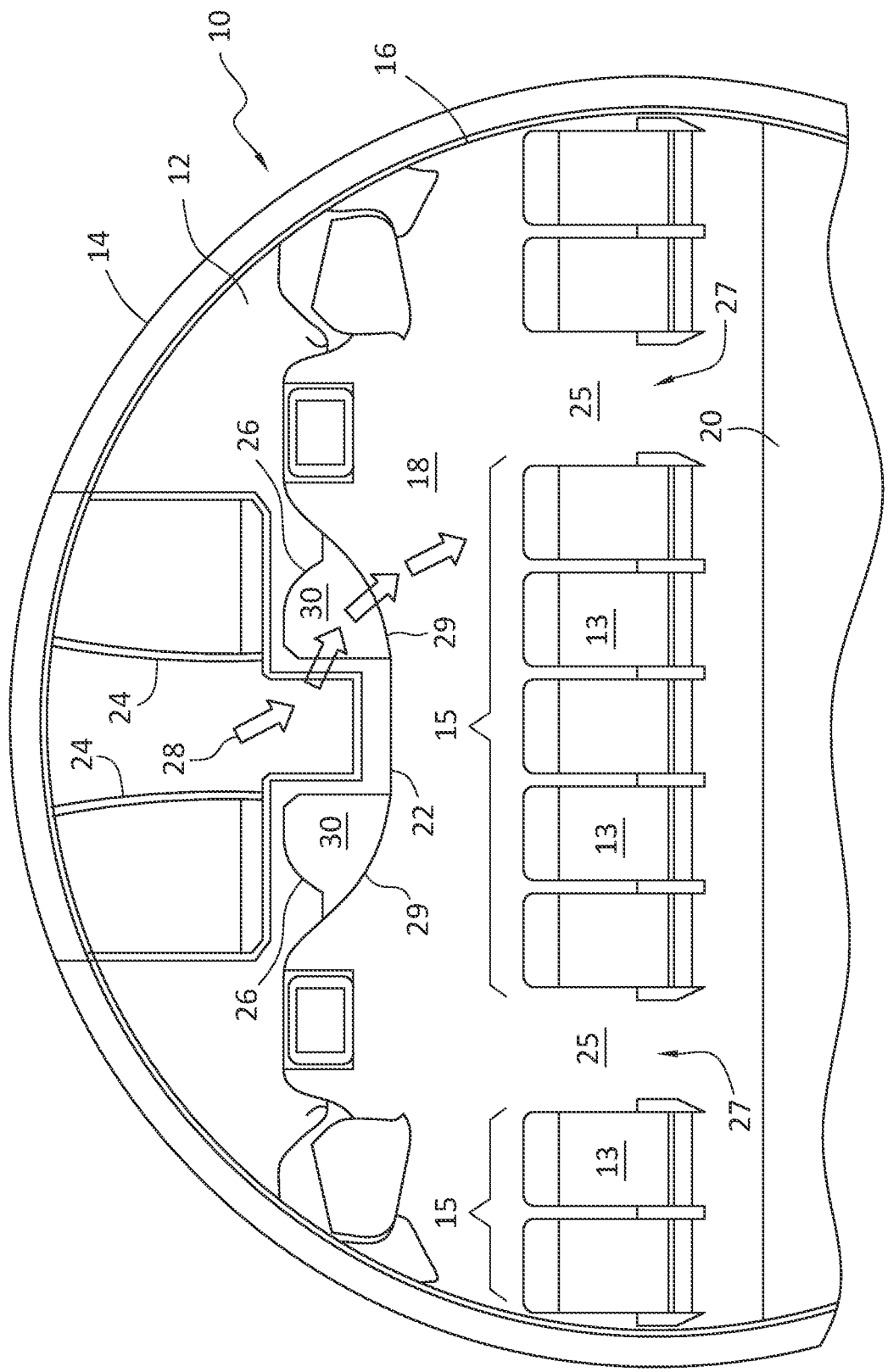
Figure 3:
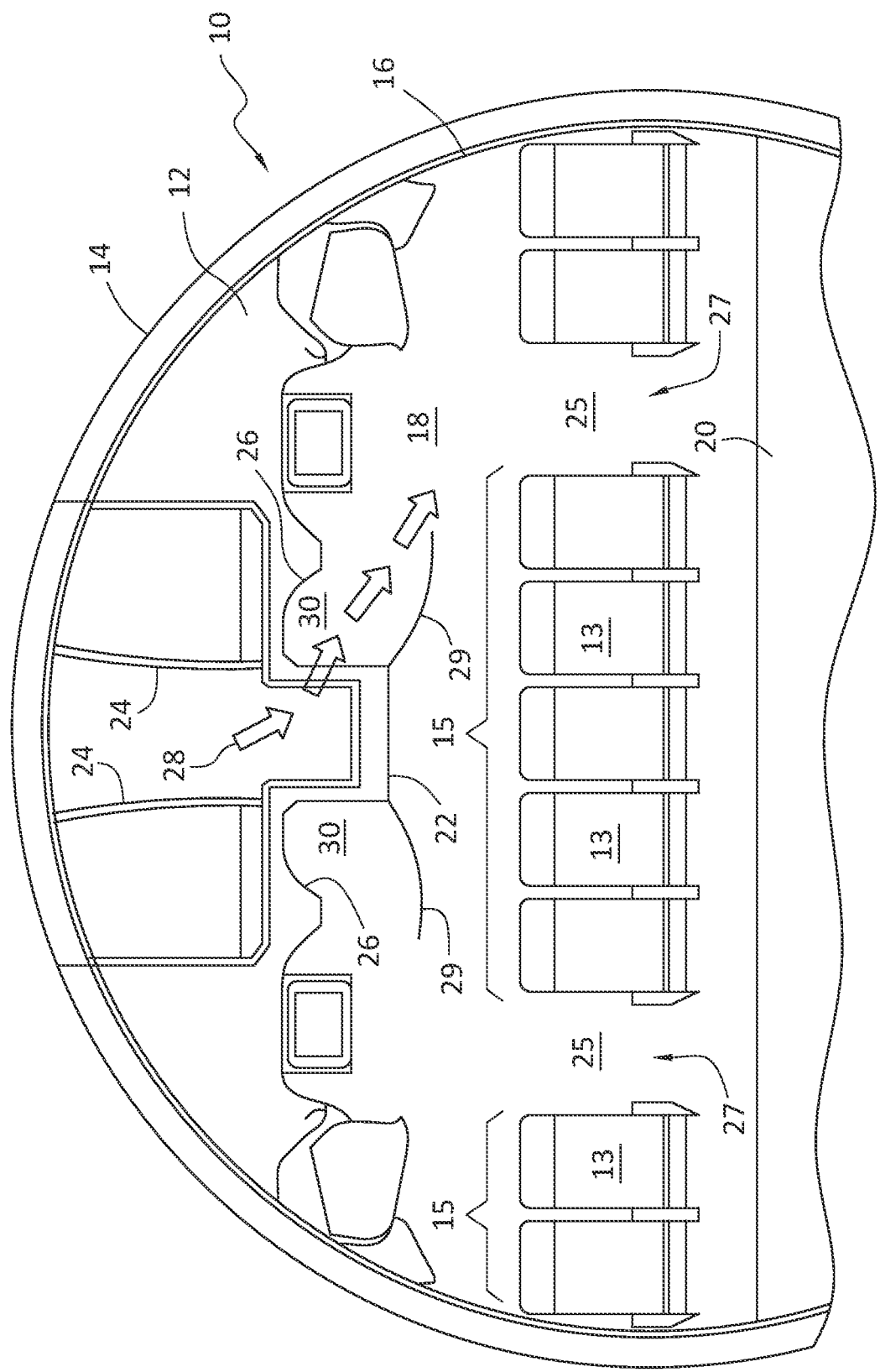
Figure 4:
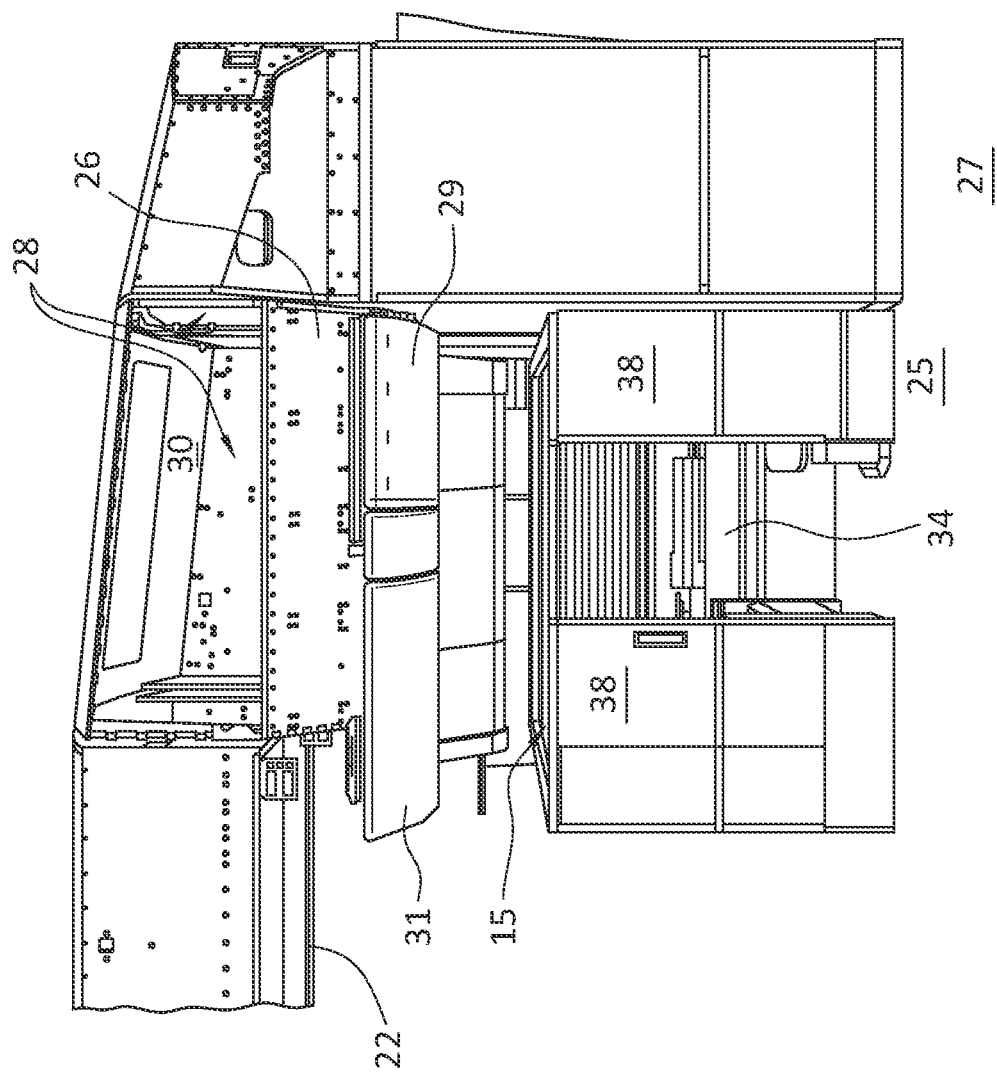
Figure 6:
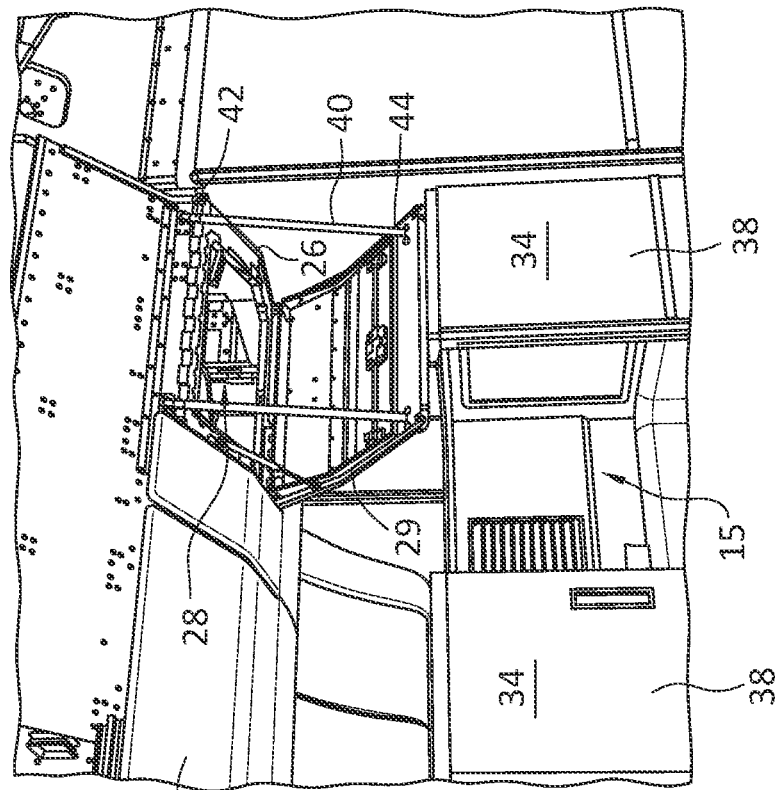
Figure 5:
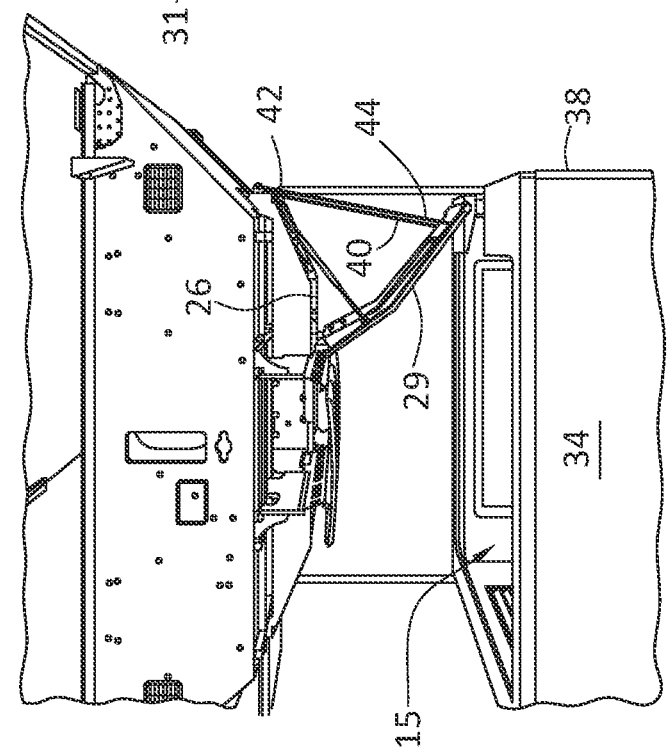
Figure 7:
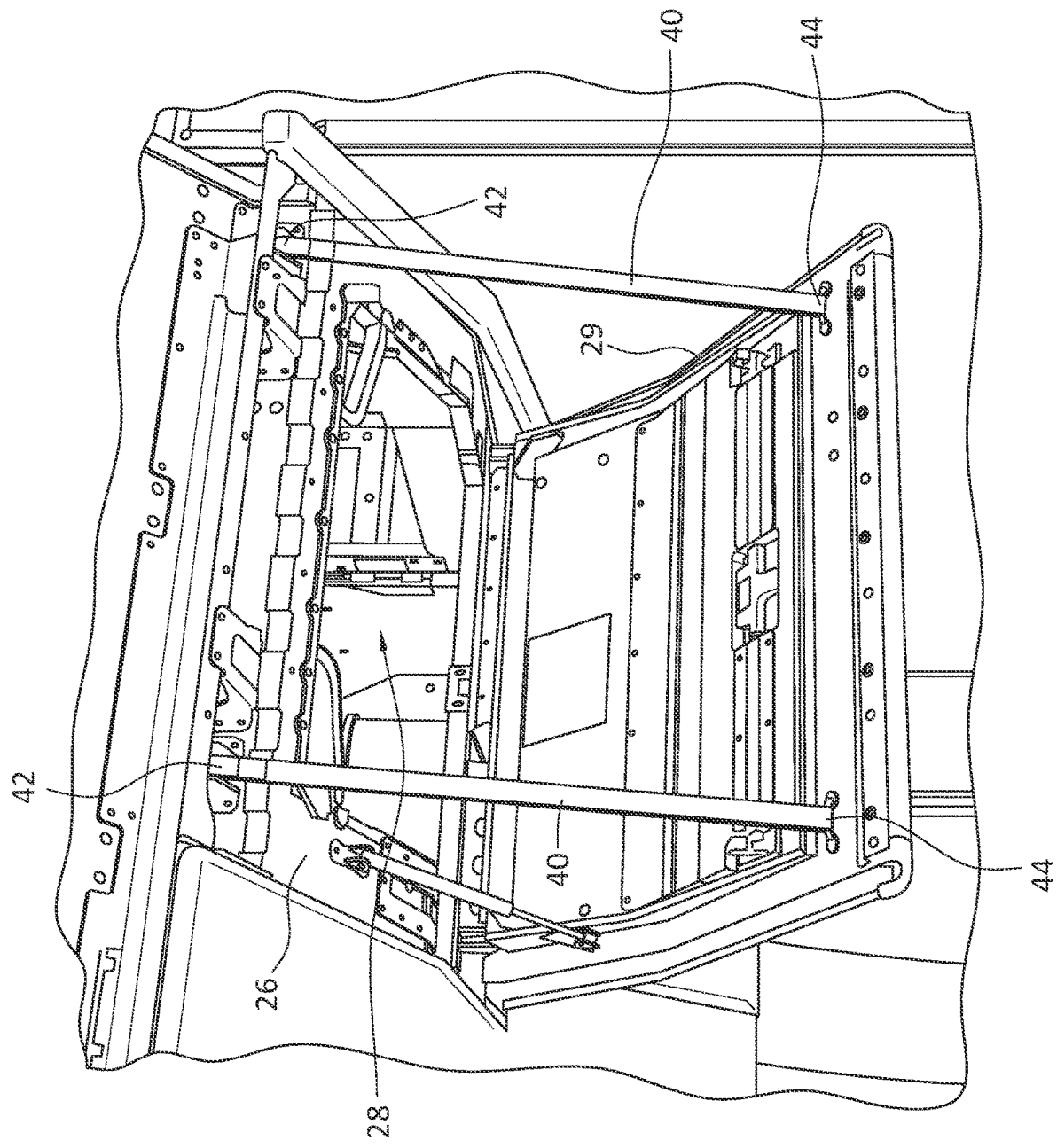
Figure 8:
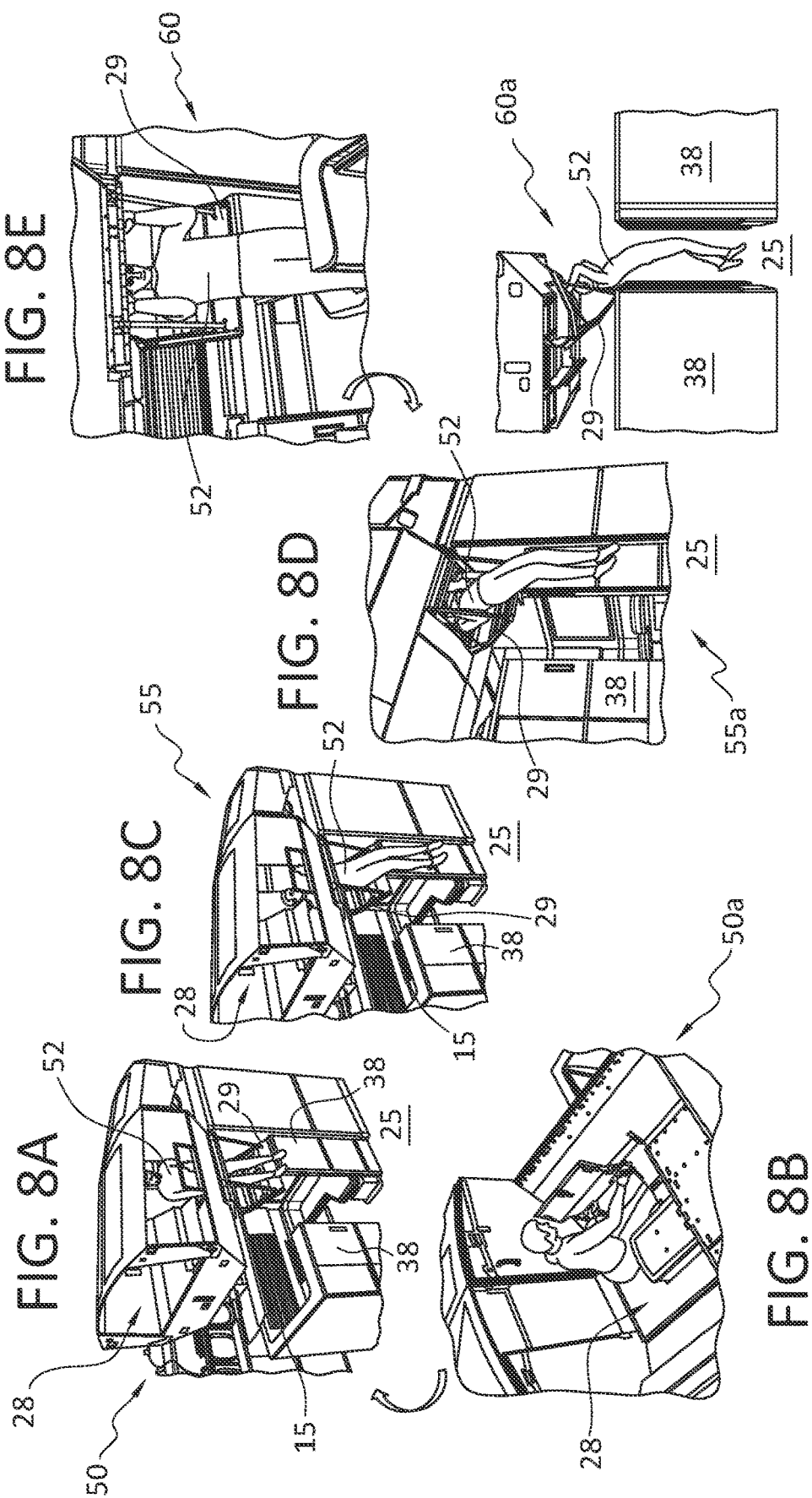
Figure 9:
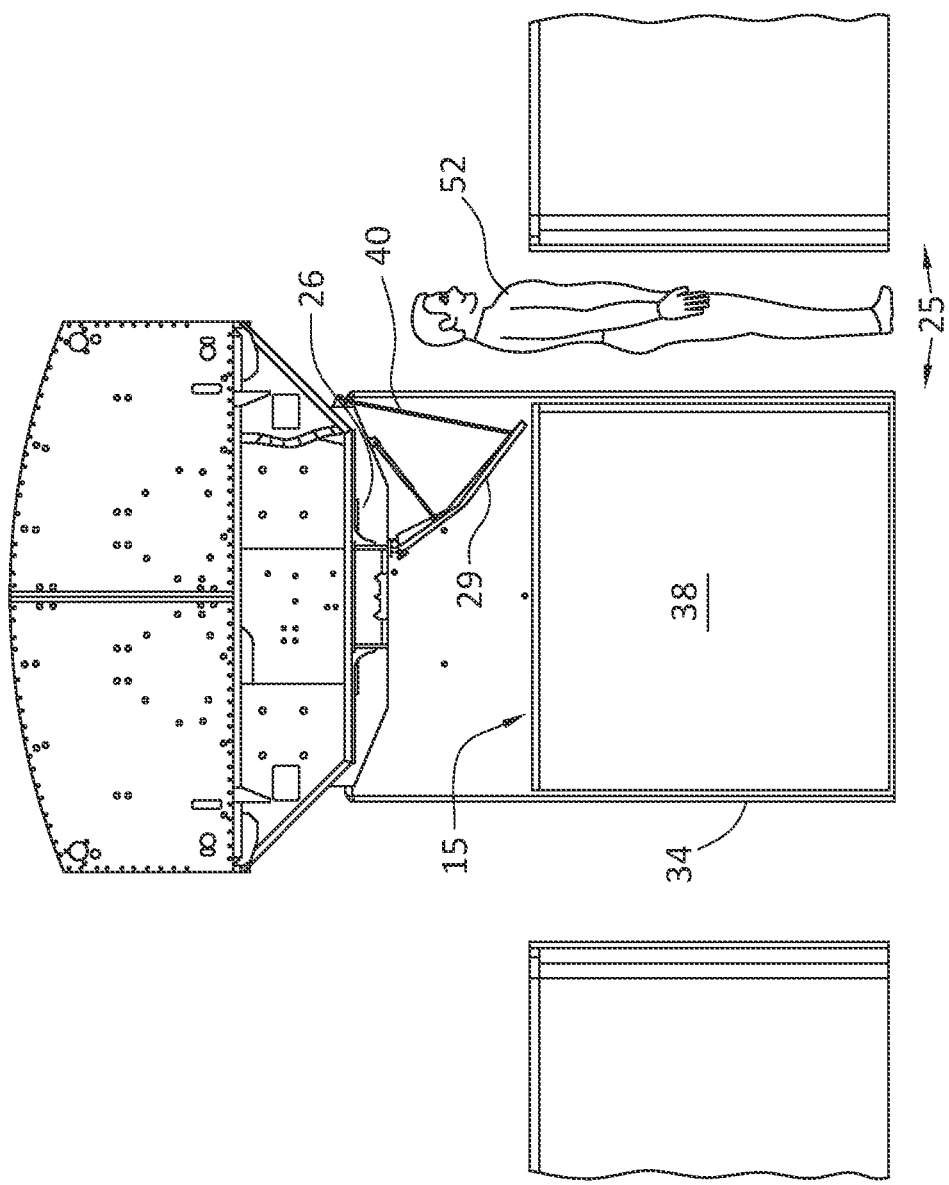
Figure 10:
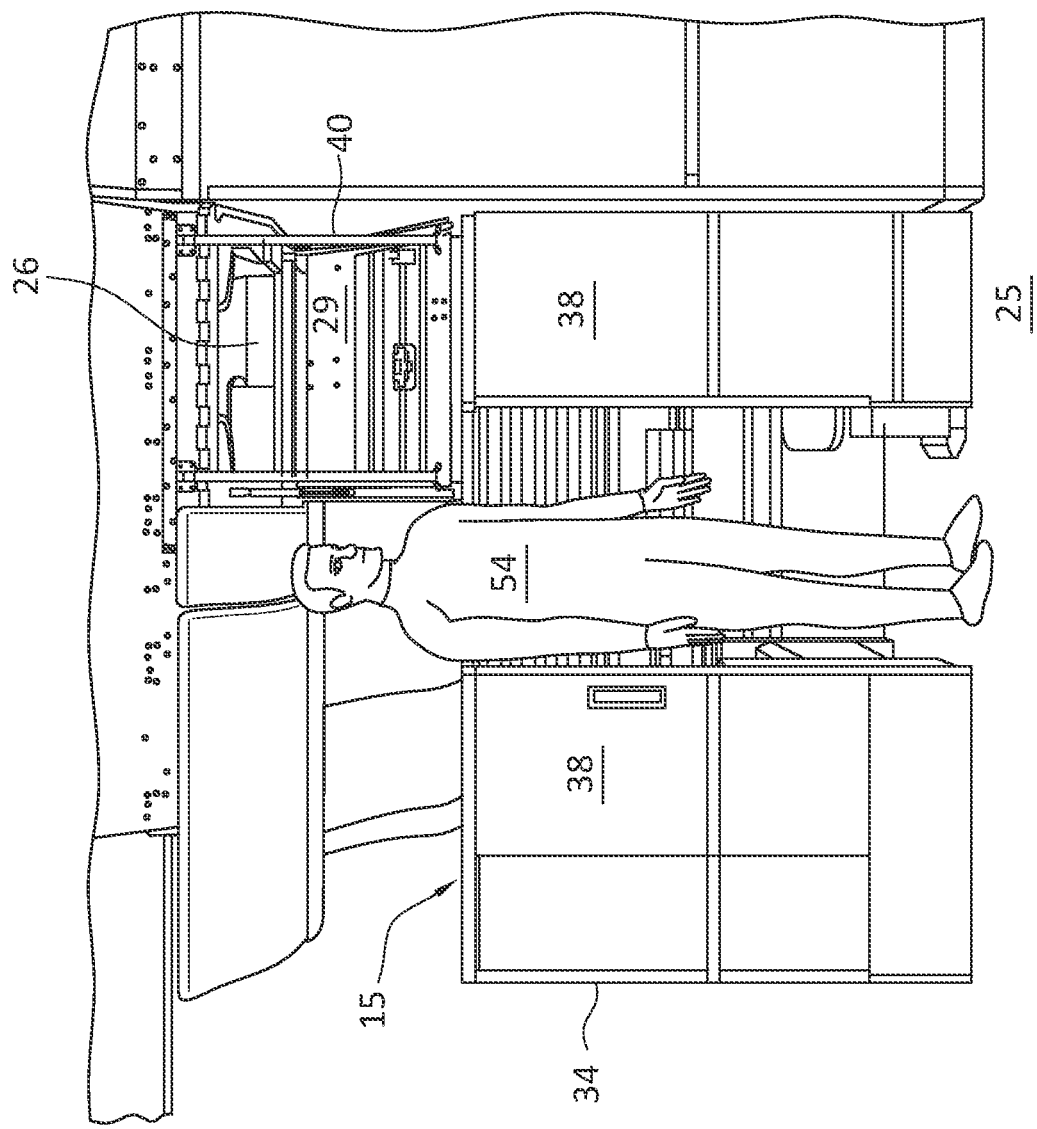
Figure 11:
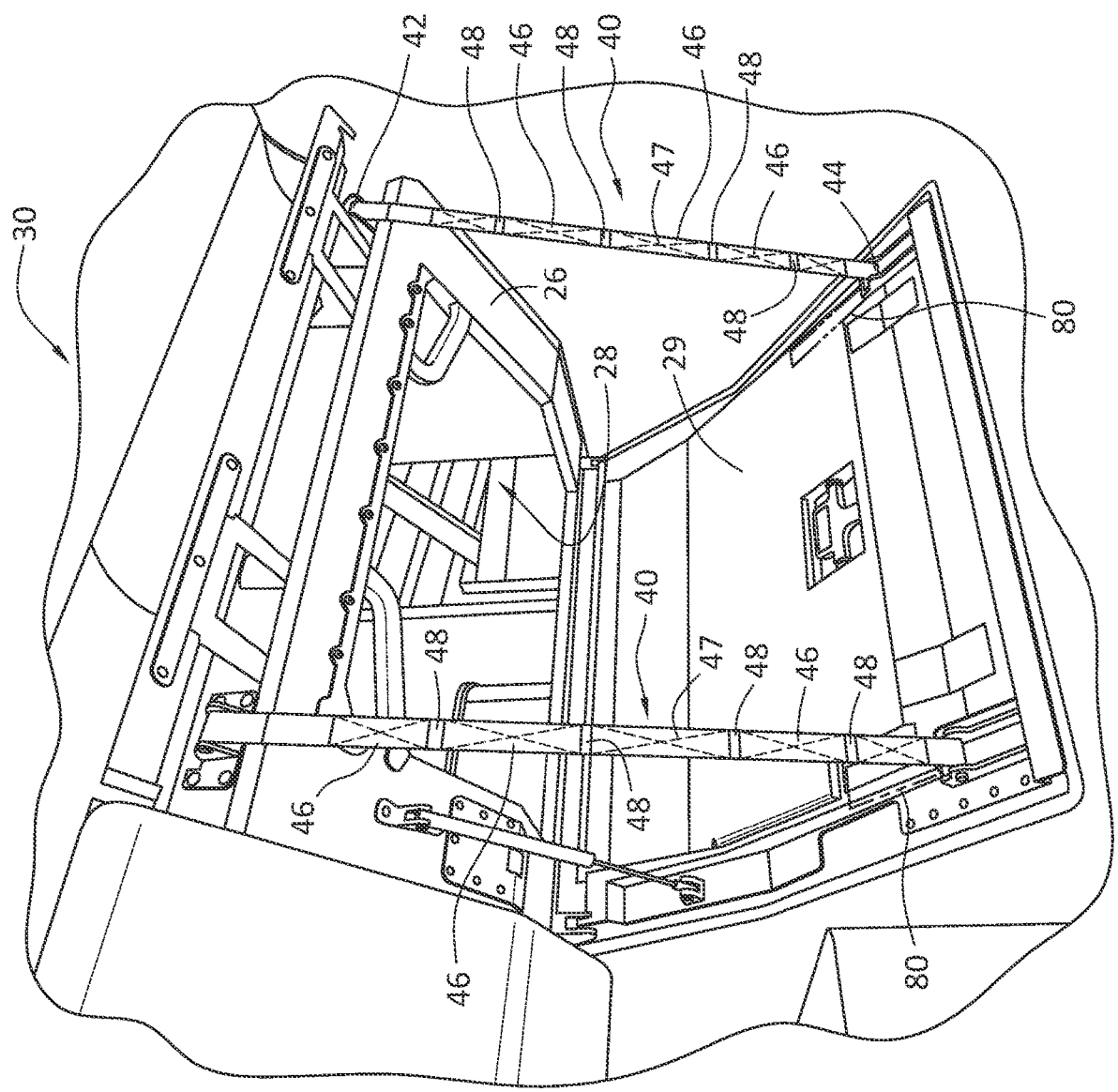
Figure 13:
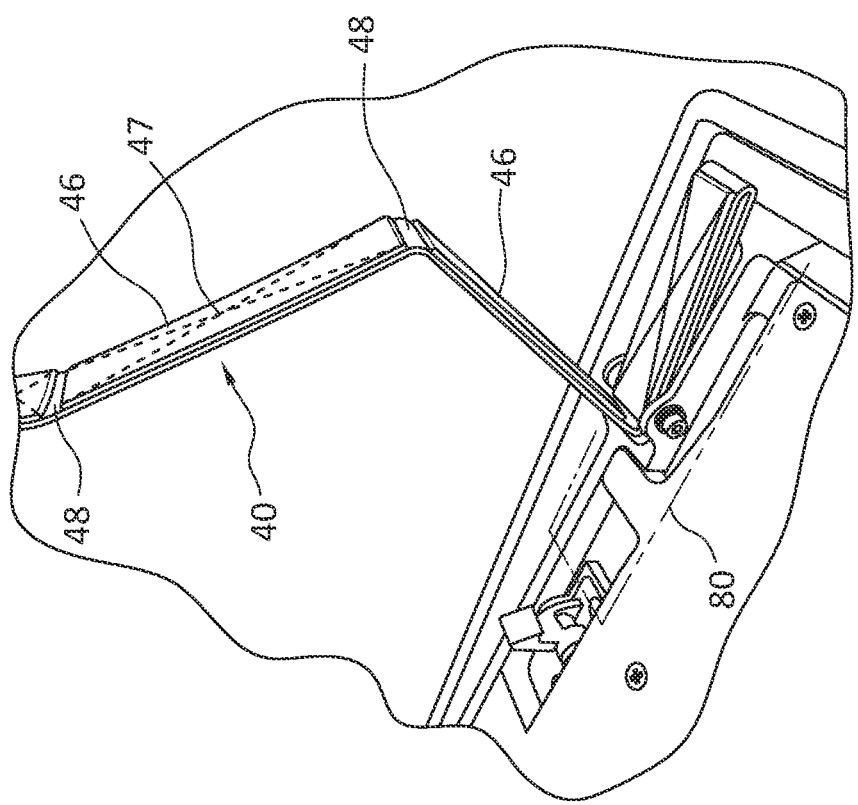
Figure 12:
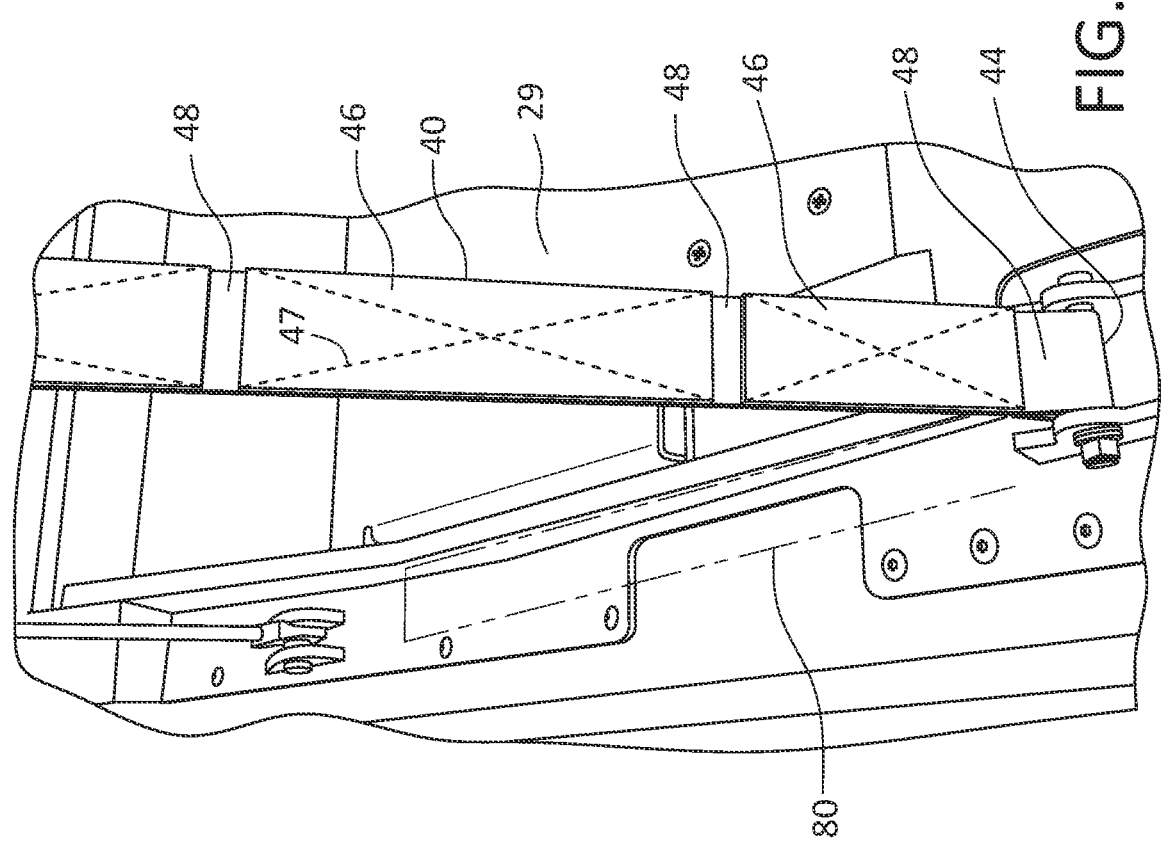
Figure 16:
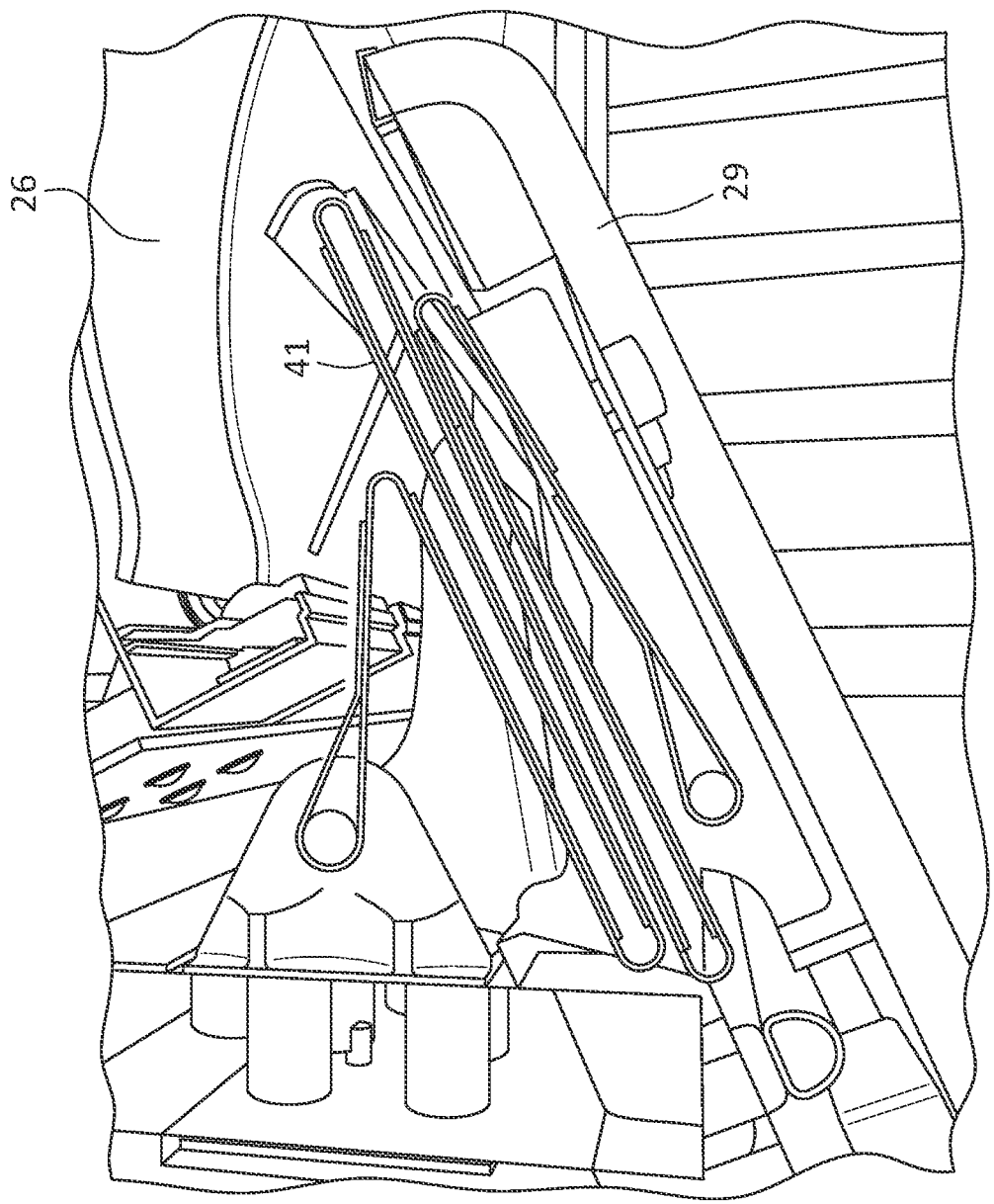
Figure 17A:
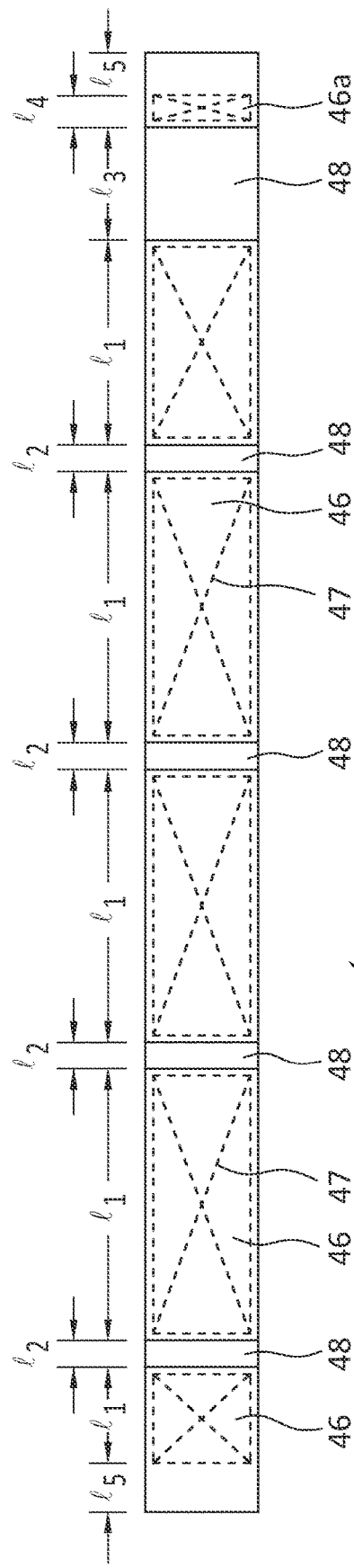
Figure 17B:
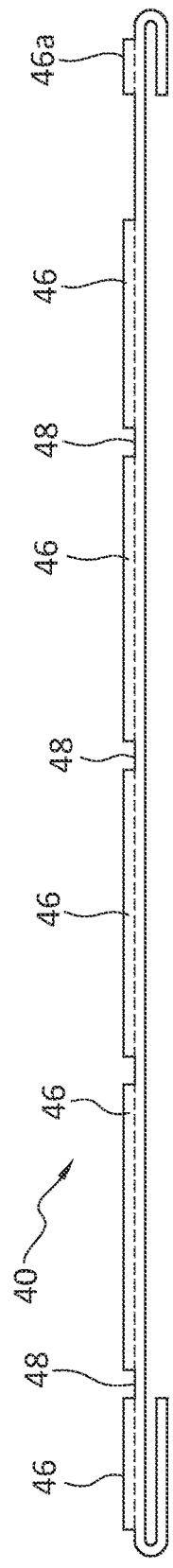
Figure 17C:
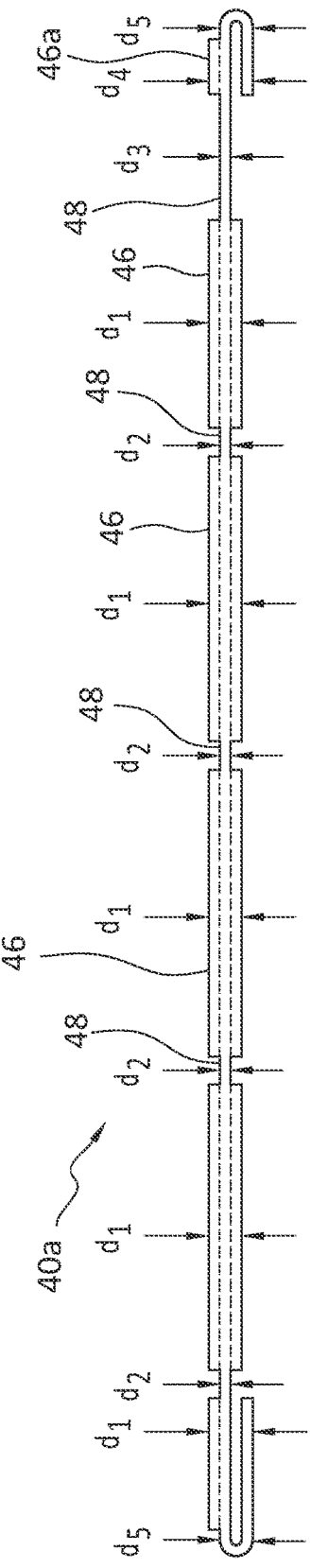
Figure 18:
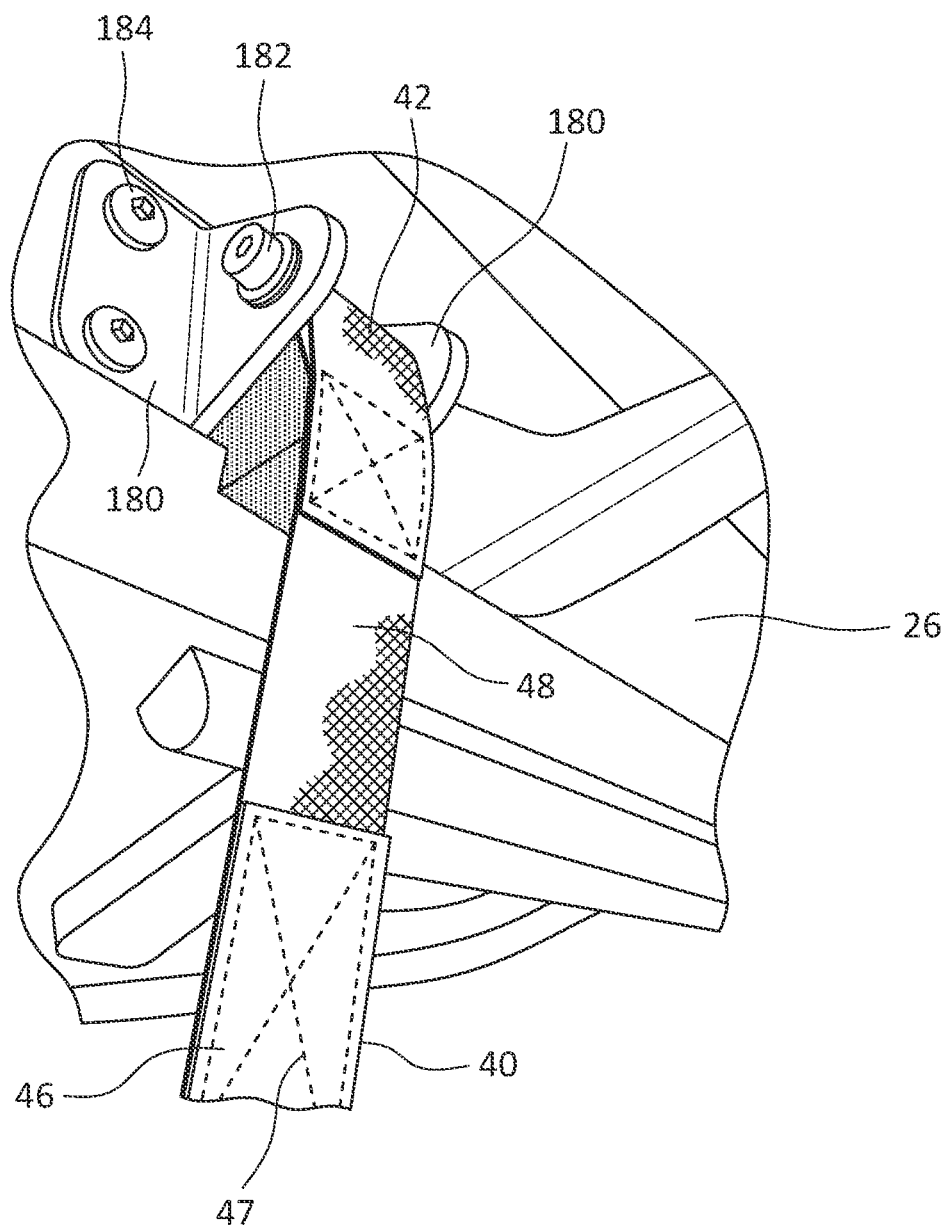
Figure 19A:
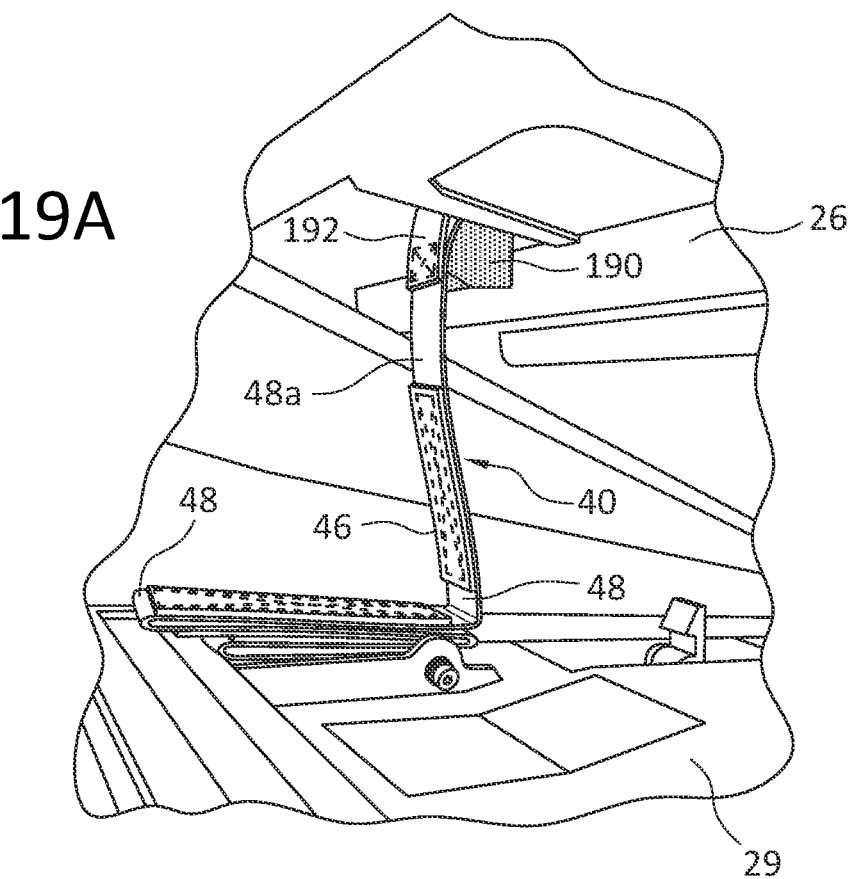
Figure 19B:
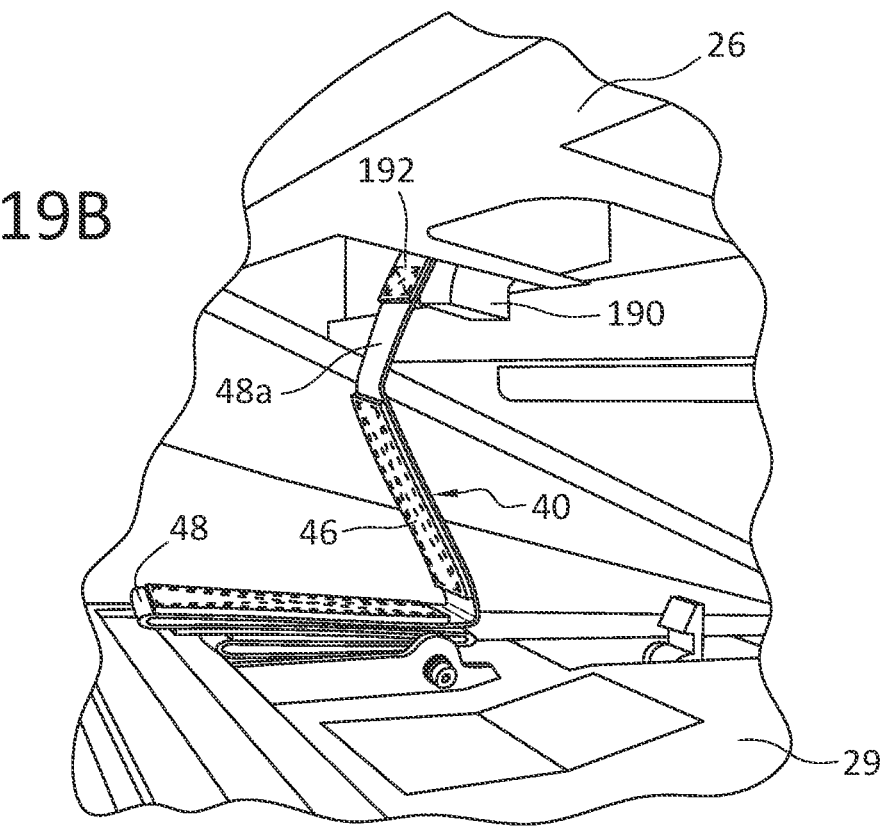
Figure 19C:
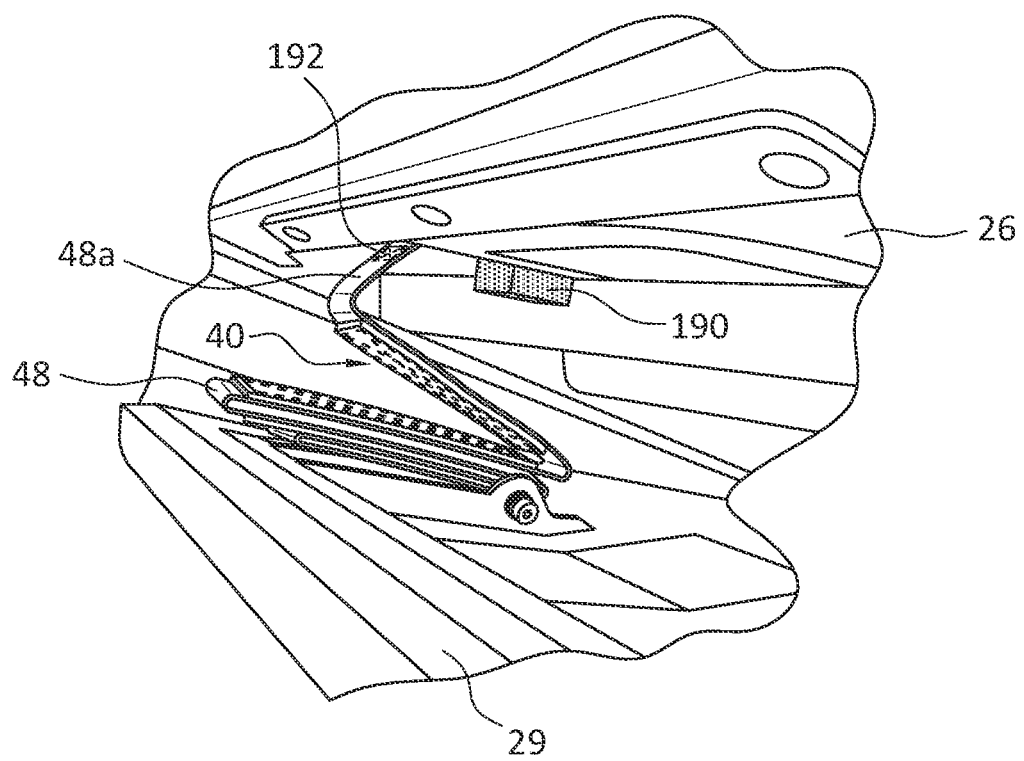
Figure 20:
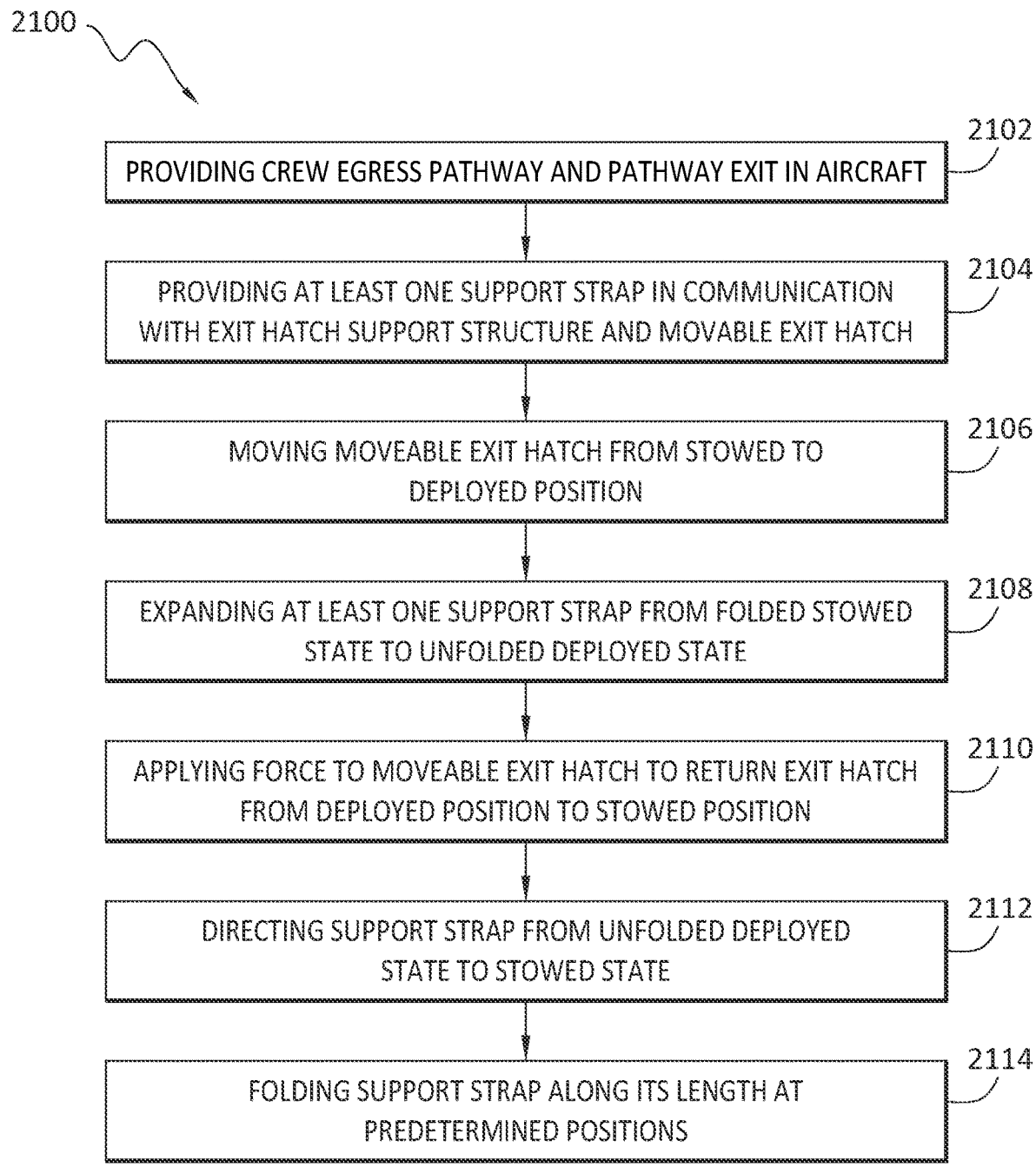
Figure 21:
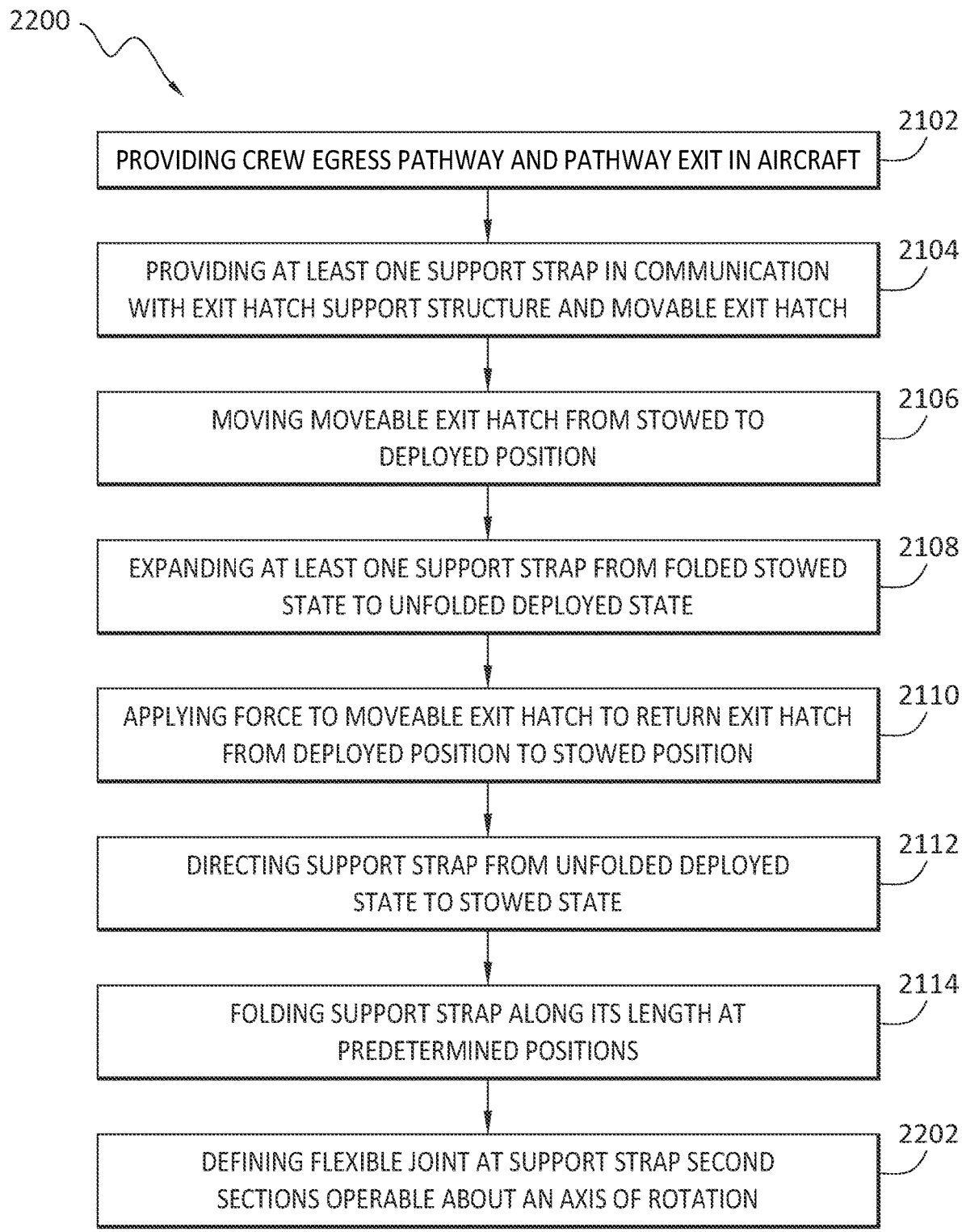

Having thus described variations of the disclosure in general terms, reference will now be made to the accompanying drawings, which are not necessarily drawn to scale, and wherein:

FIG. 1 is an illustration of an aircraft according to present aspects;

FIG. 2 is a cross-sectional view of aircraft cabin according to present aspects;

FIG. 3 is a cross-sectional view of aircraft cabin according to present aspects;

FIG. 4 is a front view of fixtures in an aircraft cabin including a crew egress pathway exit assembly according to present aspects;

FIG. 5 is a side view of a movable exit hatch in an open position or fully deployed state according to present aspects;

FIG. 6 is a perspective view of a movable exit hatch in a fully deployed state according to present aspects;

FIG. 7 is an enlarged view of a movable exit hatch in a fully deployed state according to present aspects;

FIGS. 8A through 8F show a progressive series of illustrations of a crew egress pathway exit and movable exit hatch;

FIG. 8A shows a view of a first stage of a crew member exiting a crew egress pathway exit via a movable exit hatch according to present aspects;

FIG. 8B is an elevated view of a first stage of crew member exiting a crew egress pathway exit via a movable exit hatch according to present aspects;

FIG. 8C is a view of a second stage of a crew member exiting a crew egress pathway exit via a movable exit hatch according to present aspects;

FIG. 8D is a view of a third stage of a crew member exiting a crew egress pathway exit via a movable exit hatch according to present aspects;

FIG. 8E is an enlarged front view of a fourth stage of a crew member exiting a crew egress pathway exit via a movable exit hatch according to present aspects;

FIG. 8F is a side view of the fifth stage of a crew member exiting a crew egress pathway exit into the passenger cabin area via a movable exit hatch according to present aspects;

FIG. 9 is a side view of a crew member having exited the crew egress pathway exit into the passenger cabin, with the movable exit hatch shown in the fully deployed position according to present aspects FIG. 10 is a front view of a passenger positioned at the entry point of a passenger mini-suite representing an occupied cabin region that remains unimpeded when a crew member exits the crew egress pathway exit assembly into the passenger cabin, with the movable exit hatch shown in the fully deployed position according to present aspects;

FIG. 11 is an enlarged view of the movable exit hatch shown in the deployed position according to present aspects;

FIG. 12 is an enlarged view of a support strap in communication with the movable exit hatch, with the support strap in the deployed position and the movable exit hatch in the deployed position as evidenced by the support strap being in a substantially linear, unfolded, and taught configuration along its length according to present aspects;

FIG. 13 is a perspective side view of the support strap at a juncture between the deployed position and the stowed position of the movable exit hatch, evidenced by the support strap having a bend along the length of the support strap at a joint according to present aspects;

FIGS. 14A through 14D illustrate a progression or progressive series of stages of a movable exit hatch comprising a support strap moving from a deployed configuration to a stowed configuration with the support strap folding in an intentionally induced configuration according to present aspects;

FIG. 14A shows the intentionally induced folding of the support strap during the first stage of moving the movable exit hatch from a deployed configuration to a stowed configuration according to present aspects;

FIG. 14B shows the intentionally induced folding of the support strap during the second stage of moving the movable exit hatch from a deployed configuration to a stowed configuration according to present aspects;

FIG. 14C shows the intentionally induced folding of the support strap during the third stage of moving the movable exit hatch from a deployed configuration to a stowed configuration according to present aspects;

FIG. 14D shows the intentionally induced folding of the support strap during the fourth stage of moving the movable exit hatch from a deployed configuration to a stowed configuration according to present aspects;

FIGS. 15A through 15D further illustrate a progression or progressive series of stages of a movable exit hatch comprising a support strap moving from a deployed or open configuration to a stowed or closed configuration with the support strap folding in an intentionally induced configuration during the closing of the movable exit hatch according to present aspects;

FIG. 15A shows the intentionally induced folding of the support strap during a fifth stage of moving the movable exit hatch from a deployed configuration to a stowed configuration according to present aspects;

FIG. 15B shows the intentionally induced folding of the support strap during the sixth stage of moving the movable exit hatch from a deployed configuration to a stowed configuration according to present aspects;

FIG. 15C shows the intentionally induced folding of the support strap during the seventh stage of moving the movable exit hatch from a deployed configuration to a stowed configuration according to present aspects;

FIG. 15D shows the intentionally induced folding of the support strap during the eighth stage of moving the movable exit hatch from a deployed configuration to a nearly completely stowed configuration according to present aspects;

FIG. 16 is a side exposed view of the movable exit hatch in a stowed configuration with the support strap shown in a stowed state, with the support strap comprising a plurality of predetermined folded sections along the length of the support strap according to present aspects;

FIG. 17A is an enlarged plan view of a support strap of the type that can be incorporated into and otherwise in communication with the movable exit hatch as shown in the FIGs., and according to present aspects;

FIG. 17B is an enlarged cross-sectional side view of a support strap of the type that can be incorporated into and otherwise in communication with the movable exit hatch as shown in the FIG. 17A, and according to present aspects FIG. 17C is an enlarged cross-sectional side view of the support strap shown in FIG. 17A, and of the type that can be incorporated into and otherwise in communication with the movable exit hatch as shown in the FIGs., and according to present aspects;

FIG. 18 is an enlarged partial view of the support strap engaged with the exit hatch support structure according to present aspects;

FIG. 19A is a partial view of the support strap engaged with the exit hatch support structure during movement of the movable exit hatch from a deployed configuration to a stowed configuration according to present aspects;

FIG. 19B is a partial view of the support strap engaged with the exit hatch support structure shown in FIG. 19A during further movement of the movable exit hatch from a deployed configuration to a stowed configuration according to present aspects;

FIG. 19C is a partial view of the support strap engaged with the exit hatch support structure shown in FIG. 19B during further movement of the movable exit hatch from a deployed configuration to a stowed configuration according to present aspects;

FIG. 20 is a flowchart outlining methods according to present aspects;

FIG. 21 is a flowchart outlining methods according to present aspects; and

Figure 22:
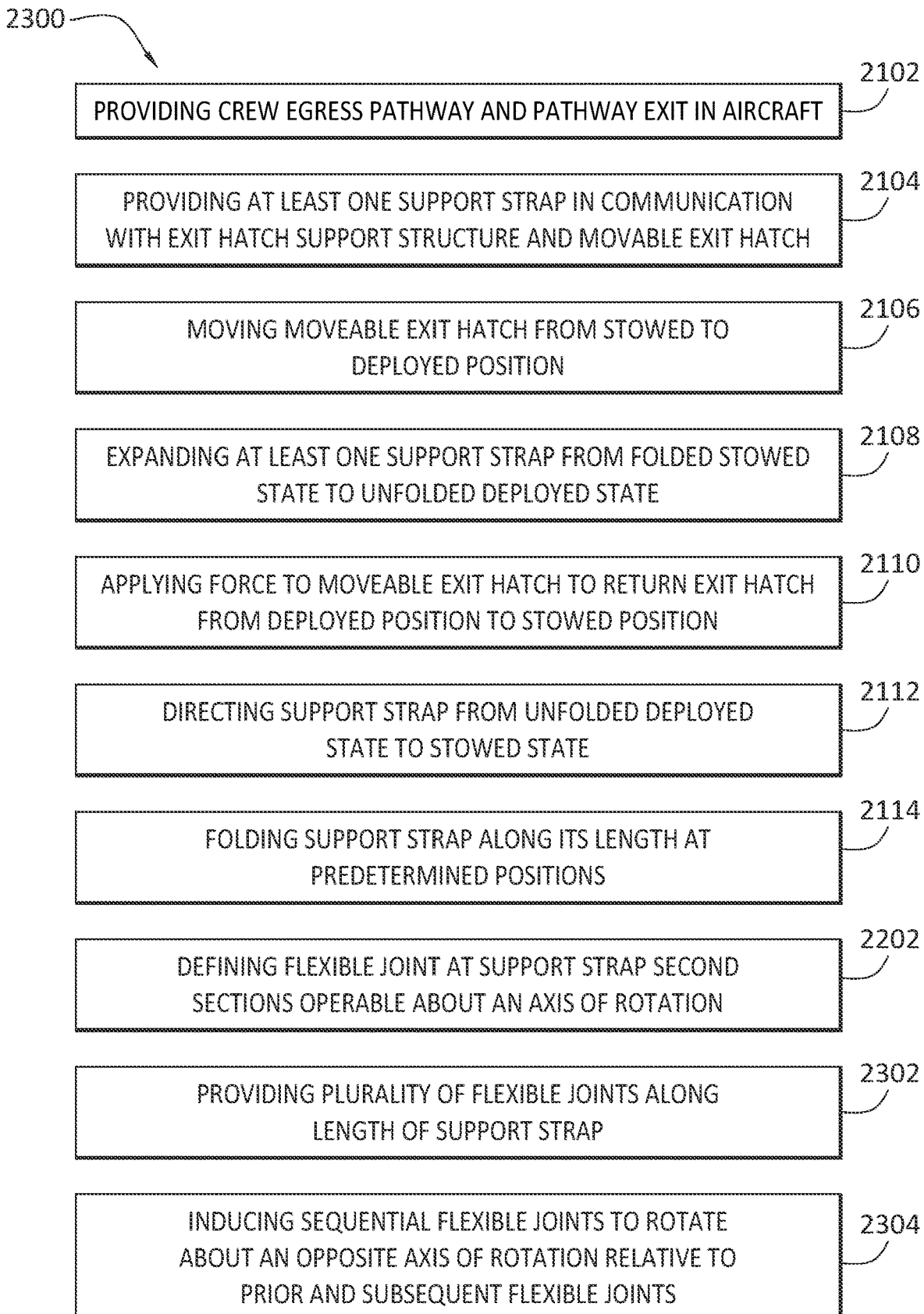

FIG. 22 is a flowchart outlining methods according to present aspects.

DETAILED DESCRIPTION

The present application discloses methods, apparatuses, and systems directed to the controlled, induced, and repeatable operation of crew egress hatches and the controlled, induced, and repeatable operation of support straps positioned within a defined area and defined footprint provided within a movable exit hatch in communication with an exit hatch support structure at a crew egress pathway exit terminus, with the crew egress hatch comprising a movable exit hatch that can be moved between a stowed (e.g., closed) configuration and a deployed (e.g., open) configuration relative to an exit hatch support structure that can be a fixed exit hatch support structure.

According to present aspects, an aircraft can comprise a crew egress pathway that is established between, bounded by, or that is otherwise in communication with a crew rest area (e.g., an overhead flight crew rest area, etc.), and further in communication with a crew egress pathway exit at a terminus of the crew egress pathway (e.g., a crew egress pathway exit assembly). Present aspects are directed to a crew egress pathway exit assembly positioned to deploy within a passenger compartment generally and, more particularly, a crew egress pathway exit that can be positioned within a first class or business class compartment. That is, according to present aspects, the presently disclosed crew egress pathway exit assembly is configured to open near, proximate to, or immediately adjoin an overhead compartment, such as, for example, an overhead storage compartment, located within the passenger compartment.

According to present aspects, the presently disclosed crew egress pathway exit assembly is configured to allow egress through the crew member pathway exit at the exit hatch support structure such that the egressing crew member descends from the crew egress support structure to a location within the passenger cabin that is uninhabited by a seated or reclining passenger area (e.g., a mini-suite, seat, bed, partitioned cabin, etc.). Such location within the passenger cabin onto and into which an egressing crew member descends can be, for example, an aircraft aisle, or other location that is not intended to be inhabited by a seated or reclining passenger.

As shown in FIG. 1, an aircraft 10 is shown to represent any form of an aircraft designed to transport passengers or cargo, with such depicted aircraft not limited to a jet aircraft but intended to represent and further include propeller-powered aircraft, rotorcraft, spacecraft, etc., without limitation.

FIG. 2 shows an aircraft interior section 12 of aircraft 10 taken along line 1-1 (shown in FIG. 1). As shown in FIG. 2, fuselage 14 is in communication with an interior wall 16. As shown in FIG. 2, aircraft interior section 12 of aircraft 10 comprises an aircraft passenger cabin 18 (referred to equivalently herein as an "aircraft cabin") with said aircraft passenger cabin 18 bounded by an aircraft cabin floor 20 and an aircraft cabin ceiling 22 (referred to equivalently herein as a "cabin ceiling"). FIG. 2 further shows passenger seats 13 arranged or otherwise grouped together to form occupied cabin regions 15. Aircraft interior section 12, as shown in FIG. 2, further includes crew rest areas 24 configured to occupy regions in an aircraft located above aircraft cabin ceiling 22. FIG. 2 further shows exit hatch support structure 26 fixedly suspended in a location that can be generally overhead of passenger seating, but that is configured such that, when the exit hatch support structure opens to a deployed position as shown in FIG. 3 (e.g., by disengaging a movable exit hatch, etc., shown in detail in subsequent FIGs. herein), the opening aligns vertically with an unoccupied cabin region 25 that is intentionally unoccupied by passengers (e.g., the exit hatch support structure is aligned vertically over an aisle 27, etc.).

The crew rest areas 24 can be oriented in any configuration in the regions above an aircraft cabin ceiling 22. As shown in FIG. 2, the crew rest areas 24 are in communication with and allow passage of a crew member from the crew rest areas 24 along a crew egress pathway 28 (denoted in FIG. 2 as a series of arrows). As shown in FIG. 2, crew egress pathway 28 extends from the crew rest areas to the crew egress pathway exit assembly 30 that includes exit hatch support structure 26 and the movable exit hatch 29. As shown in FIG. 2, the crew egress pathway assembly is in a stowed position (referred to equivalently as a stowed "state"), with the movable exit hatch 29 in a closed position immediately proximate to exit hatch support structure 26.

FIG. 3 shows aircraft interior section 12 of aircraft 10, as shown in FIG. 2. FIG. 3 shows crew egress pathway 28 extending from the crew rest areas to the crew egress pathway exit assembly 30 that includes exit hatch support structure 26 and the movable exit hatch 29, with the difference between FIGS. 2 and 3 being the position or "state" of the movable exit hatch 29 of the crew egress pathway exit assembly 30. As shown in FIG. 3, the crew egress pathway exit assembly is in a deployed position (referred to equivalently as a deployed "state"), with the movable exit hatch 29 in an "open" position relative to the exit hatch support structure 26.

FIG. 4. shows an exposed front view of an aircraft passenger cabin 18 that can be of the type found within aircraft 10 (shown in FIGS. 1, 2, and 3). As shown in FIG. 4, an occupied cabin region 15 in the form of a passenger mini-suite 34 can be bounded, at least in part, by partition 38. The occupied cabin region 15 can be at least partially separated from an unoccupied cabin region 25, and unoccupied cabin region 25 can coincide with or otherwise adjoin, for example, aisle 27. Crew egress pathway 28 is shown as terminating in the crew egress pathway exit assembly 30 that comprises the exit hatch support structure 26, with movable exit hatch 29 shown in movable communication with the exit hatch support structure 26. As shown in FIG. 4, the movable exit hatch 29 is in communication with, and allows egress from the crew egress pathway 28. As shown in FIG. 4, overhead storage bin 31 can be located proximate to or near the crew egress pathway exit assembly 30 and the movable exit hatch 29.

FIGS. 5 and 6 further illustrate the exit hatch support structure 26 and the movable exit hatch 29 relative to the occupied cabin region 15 and the unoccupied cabin region, with the movable exit hatch shown in the open, or deployed position (equivalently referred to as the "deployed state" and/or the "deployed configuration"). FIG. 5 is a side view of the cabin interior that can be of the type as shown in FIG. 4, with FIG. 5 showing the exit hatch support structure 26 in communication with the movable exit hatch 29, and with the movable exit hatch 29 shown in an open, or deployed configuration. FIG. 5 more clearly illustrates that the movable exit hatch in the deployed position would deposit an exiting crew member (e.g. a crew member exiting a crew egress pathway through the crew egress pathway exit) outside of an occupied cabin region 15 and beyond the partition 38 that outlines a perimeter of the passenger mini-suite 34 that bounds an occupied cabin region 15. FIG. 5 further illustrates support strap 40 having support strap first end 42 fixedly attached to exit hatch support structure 26 and support strap second end 44 fixedly attached to movable exit hatch 29.

FIG. 6 is a perspective front view of the cabin interior as shown in FIGS. 4 and 5 with FIG. 6 showing the exit hatch support structure 26 in communication with the movable exit hatch 29, and with the movable exit hatch 29 shown in an open, or deployed configuration. FIG. 6 further illustrates support strap 40 having support strap first end 42 fixedly attached to exit hatch support structure and support strap second end 44 fixedly attached to movable exit hatch 29. As shown in FIG. 6, the movable exit hatch is in an open, or deployed position that allows access to and from the crew egress pathway 28. As shown in FIG. 6, access from and out of the crew egress pathway 28 to the movable exit hatch 29 is facilitated, as the movable exit hatch 29 is in an open, or deployed position. As further shown in FIG. 6, overhead storage bin 31 can be located proximate to or near the crew egress pathway exit assembly 30 and the movable exit hatch 29.

FIG. 7 is a perspective front view of the cabin interior as shown in FIGS. 4, 5, and 6, with FIG. 7 showing the exit hatch support structure 26 in communication with the movable exit hatch 29, and with the movable exit hatch 29 shown in an open, or deployed configuration. FIG. 7 further illustrates support strap 40 having support strap first end 42 fixedly attached to exit hatch support structure and support strap second end 44 fixedly attached to movable exit hatch 29. As shown in FIG. 7, the movable exit hatch is in an open, or deployed position that shows the open access to and from the crew egress pathway 28.

According to further present aspects, FIGS. 8A, 8B, 8C, 8D, 8E, and 8F show a progression through various stages of a crew member egress from a crew egress pathway through a presently disclosed crew egress pathway exit that includes a movable exit hatch comprising the presently disclosed support straps. The crew member egress progression illustrates how, through the use of the presently disclosed apparatuses, systems, and methods, a crew member can be successfully, safely, (and while conforming to regulatory procedures) is able to exit the crew egress pathway at the crew egress pathway exit assembly that is located within a passenger compartment, while also descending safely from the crew egress pathway exit assembly into an area within the passenger cabin that is not designed to be inhabited by a seated or reclining passenger.

According to present aspects, FIG. 8A is a partially exposed front elevated view showing a first stage of crew member egress 50 within the progression of crew member egress shown in the progression illustrated in FIGS. 8A through 8F. As shown in FIG. 8A, in a first stage of crew member egress 50, view crew member 52 is positioned at the crew egress pathway exit assembly located at a terminus of the crew egress pathway 28, with crew member 52 shown maneuvering through exit hatch support structure 26 and descending along the movable exit hatch 29 that is in an open and deployed position. According to present aspects, FIG. 8B is a partially exposed back elevated view showing the first stage of crew member egress 50*a*.

According to present aspects, FIG. 8C is a partially exposed front elevated view showing a second stage of crew member egress 55 within the progression of crew member egress shown in the progression illustrated in FIGS. 8A through 8F. As shown in FIG. 8C, in the second stage of crew member egress 55, crew member 52 continues to descend along movable exit hatch 29 that is open and deployed. Crew member 52 is now further descended from the crew egress pathway exit assembly at a terminus of the crew egress pathway 28, with crew member 52 about to contact an area of unoccupied cabin region 25 that can be, for example an aisle. FIG. 8D is a slightly enlarged partially exposed front view showing the second stage of crew member egress 55*a* within the progression of crew member egress shown in the progression illustrated in FIGS. 8A through 8F.

According to present aspects, FIG. 8E is an enlarged partially exposed front view showing a third stage of crew member egress 60 within the progression crew member egress shown in the progression illustrated in FIGS. 8A through 8F, where crew member 52 has nearly fully emerged from the crew egress pathway exit assembly, and is further about to contact an area of unoccupied cabin region 25 that can be, for example an aisle. According to present aspects, FIG. 8F is a side view (of view shown in FIG. 8E) showing the third stage of crew member egress 60*a* within the progression of crew member egress shown in the progression illustrated in FIGS. 8A through 8F. The illustrated side view 60*a* shown in FIG. 8F clearly depicts crew member 52 evacuating the crew egress pathway assembly via the movable exit hatch 29 of the crew egress pathway exit such that crew member 52 will not descend into the area of a seated or reclining passenger. Instead, as shown in FIGS. 8A, 8B, 8C, 8D, 8E, and 8F crew member 52 leaves the crew egress pathway and descends into the passenger cabin via the crew egress pathway exit and contacts an aisle, or other region designated as an unoccupied cabin region 25 that is located outside of or beyond partitions 38 that can form the outer perimeter of a passenger occupied cabin region 15 that can be, for example, a passenger mini-suite 34, etc. of the type shown at least in FIGS. 5 and 6.

FIG. 9 illustrates a side view with the crew egress maneuver now completed, with the crew member 52 completely descended from and no longer in contact with the movable exit hatch 29, with the crew member having safely and successfully negotiated an egress from the crew egress pathway and crew egress pathway exit assembly and into the passenger cabin, while also emerging into an unoccupied cabin region 25 that can be, for example, an aisle, leaving the occupied cabin region 15 undisturbed throughout the egress maneuver.

FIG. 10 is a front view of a passenger 54 occupying the threshold region or entry of an occupied cabin region 15 that can be, for example, a passenger mini-suite 34. According to present aspects, FIG. 10 further shows a front view of the movable exit hatch 29 still in a deployed configuration with support straps 40 visible and with support straps also in the fully extended, unfolded, and deployed configuration, with the still deployed movable exit hatch 29 not impeding the passenger from entering or exiting the designated occupied cabin region 15.

According to present aspects, a crew egress pathway exit assembly comprises a movable exit hatch that, in turn, further comprises deployable support straps that unfold when the movable exit hatch is opened (e.g., when the movable exit hatch at least partially disengages from the exit hatch support structure). As the movable exit hatch and the support straps commensurately deploy, the support straps unfold from a folded state with the folded support straps housed in a substantially stacked orientation within a folded support strap footprint or folded support strap storage area with each support strap folded back and forth upon itself along its length, such that the support straps at rest in a stowed state are maintained in an untangled state within the movable exit hatch in a preselected area that corresponds to the folded support strap footprint within the movable exit hatch, with the preselected area having a folded support strap footprint width that is substantially equivalent to the width of the (unfolded) support strap (e.g., the width of the support strap when the support strap is in an unfolded or deployed configuration).

When the movable exit hatch is returned to a stowed state from the deployed state, the foldable support straps bend at preselected bendable "joints" or bendable "joint areas" that are positioned along the length of the support straps, with a plurality of spaced joints configured to bend in alternating sequence that is repeatable and predetermined to cause the support strap to fold upon itself along its length as the movable exit hatch is closed (e.g., as the movable exit hatch is moved from a deployed configuration or deployed position to a stowed configuration or stowed position).

FIG. 11 shows an enlarged view of the crew egress pathway exit assembly 30 in the deployed (e.g., open) configuration, according to present aspects. As shown in FIG. 11, crew egress pathway exit assembly 30 comprises exit hatch support structure 26 in communication with movable exit hatch 29. FIG. 11 further shows support straps 40 in a fully deployed (e.g., unfolded) state with each of the two support straps 40 shown comprising a support strap first end 42 engaged with, attached to, or otherwise in communication with the exit hatch support structure 26, and support strap second end 44 engaged with, attached to, or otherwise in communication with the movable exit hatch 29. Support straps 40, as shown in FIG. 11, further comprise support strap first sections 46 with support strap second sections 48 interposed between the support strap first sections 46.

According to present aspects, the support straps 40 can be made from any useful material where bending stiffness characteristics can be imparted to the support strap first section 46 and the support strap second sections 48. The support strap first sections 46 and the support strap second sections 48 can be made from at least one of nylon, cloth, plastic, metal, and combinations thereof. As shown in FIG. 11, the support strap first sections 46 and support strap second sections 48 are made from a nylon material that can be a reinforced nylon material.

FIG. 11 further shows support strap first section 46 comprising at least two layers of material that have been stitched and/or adhered together as evidenced by the stitching 47 that can appear in any useful pattern (and that can be referred to equivalently as "stitching pattern"). The support strap first sections 46 are constructed to have a bending stiffness that exceeds the bending stiffness of the support strap second sections 48. The support strap second sections can be made from a single layer of material that can be the same or different from the material used to fabricate the support strap first sections 46 so long as the support strap second sections 48 have a bending stiffness that is less than the bending stiffness of the support strap first sections 46. As shown at least in FIG. 11, the support strap 40 can comprise a first layer of nylon that can extend for the desired length of the support strap, with the support strap first sections 46 comprising an additional "patch" or "patch layer" that is stitched to the first nylon layer to form the support strap first section 46. The addition of the "patch layers" render support strap first sections 46 with a two layer thickness of a selected material (e.g., a material that can be nylon). The one-layer support strap second sections 48 that interrupt the continuity of the two-layer support strap first sections 46, or that are otherwise interposed between adjacent two-layer support strap first sections are configured to have a bending stiffness that is less than the bending stiffness of the two-layer support strap first sections 46. While the support strap first sections are shown in the FIGs. as comprising two or three layers, and the support strap second section are shown in the FIGs. as comprising a single layer, present aspects contemplate the use of any desired number of material layers for the support strap first and second sections, so long as the resulting bending stiffness of the support strap second sections is less than the bending stiffness of the support strap first sections.

According to present aspects, a force can be applied to the support strap 40 during deployment of the support strap 40 (e.g., the force applied to the support strap 40 during opening of the movable exit hatch 29 causing the unfolding of the support strap 40), and force can be applied to the support strap 40 during stowage of the support strap (e.g., the force applied to the support strap 40 during closing of the movable exit hatch 29 causing the folding or re-folding of the support strap 40). As a force is applied to the support strap 40 during deployment (e.g., the force applied to the support strap that can be the result of the weight of the movable exit hatch descending from the exit hatch support structure), the support strap second sections 48 will act as joints (e.g., pivot areas), that will bend in a predetermined configuration to cause the length of the support strap to unfold from a folded state as the support strap (and the movable exit hatch 29) is deployed.

As a force is applied to the support strap 40 during stowage (e.g., the force applied to the support strap that can be the result of a force applied to stow or close the movable exit hatch, for example, to re-engage the movable exit hatch 29 with the exit hatch support structure 26), the support strap second sections 48 will act as joints (e.g., pivot areas), that will bend in a predetermined configuration to cause the length of the support strap 40 to fold upon itself into support strap folded segments as the support straps are converted from the support strap deployed and unfolded state to a support strap stowed and folded state.

FIG. 11 further shows a folded support strap footprint 80, with the folded support strap footprint 80 representing the area occupied by the support strap in the folded configuration. As shown at least in FIG. 11, the folded support strap footprint 80 length and width equals the desired two-dimensional area (e.g., the length and width of the folded support strap within the movable exit hatch 29 with the width) of the support strap 40 in a "stacked orientation" in the stowed state and folded configuration, with the support strap repeatedly folded upon itself), with the support strap footprint width being approximately equal to the width of the support strap 40 in the unfolded or deployed state. In the folded or stowed configuration, the support strap in the stacked configuration can comprise a plurality of folded lengthwise support strap segments that are stacked in a substantially coincident lengthwise profile maintained within a support strap footprint having a desired footprint length, and with the width of the stacked (e.g., the folded or stowed support strap) maintained within the footprint width of the folded support strap footprint 80.

FIGS. 12 and 13 show enlarged views of the support strap 40 of the type shown in FIG. 11. FIG. 12 is an enlarged perspective view showing support strap second end 44 engaged with and attached to the movable exit hatch 29. Support strap 40, as shown in FIG. 12, further comprises support strap first sections 46 with support strap second sections 48 interposed between the support strap first sections 46, and FIG. 12 further shows the folded support strap footprint 80 as a dotted line that comprises and represents the area that can be referred to as the folded support strap footprint 80 that can be any desired area configured to not interfere with stowage and deployment of the movable exit hatch 29 and attendant mechanisms configured to secure and stow the movable exit hatch 29 (e.g., latches, securing mechanisms configured to interlock and release on demand, etc.). FIG. 12 further shows stitching 47 occurring at the support strap first sections 46 that can appear in any useful pattern. As is apparent in FIG. 12, the thickness of the support strap first sections 46 is greater than the thickness of the support strap second sections 48, with the support strap first sections 46 having a bending stiffness that is greater than the bending stiffness of the support strap second sections 48.

FIG. 13 is an enlarged perspective view of the support strap 40 of the type shown in FIGS. 11 and 12, with the support strap 40 shown in a state or configuration that is between the fully deployed (e.g., unfolded) and the fully stowed (e.g., folded) state. As shown in FIG. 13, support strap 40 further comprises support strap first sections 46 with support strap second sections 48 interposed between the support strap first sections 46, and FIG. 13 further shows the folded support strap footprint 80 as a dotted line that comprises and represents the area that can be referred to as the folded support strap footprint. According to present aspects, the folded support strap footprints 80 can each occupy a substantially equivalent area, if desired, when multiple support straps are present, the multiple folded support strap footprints can vary in length from one another. FIG. 13 again shows stitching 47 occurring at the support strap first sections 46 that can appear in any useful pattern, as desired. As is more apparent in FIG. 13, the thickness of the support strap first sections 46 is greater than the thickness of the support strap second sections 48, with the bending stiffness of the support strap first sections 46 being greater than the bending stiffness of the support strap second sections.

Support strap 40, as shown in FIG. 13, bending at the joints or pivot areas that result from the support strap bending at the support strap second sections 48 as the support strap second sections 48 are configured to possess bending stiffness values that are less than the bending stiffness values of the support strap first section 48. Consequently, and according to present aspects, the predetermined location of the support strap second sections along the length of support strap 40 induce the support strap 40 to bend at predetermined locations and in predetermined alternating directions about a pivoting axis region within each sequential support strap second section (e.g., with sequential support strap second sections bending "inwardly" then "outwardly", or "forward" and "backward" in alternating fashion). The induced alternating bending direction pattern results in the orderly "stacking" of predetermined lengths of the support strap 40 upon themselves, with the stacking of predetermined lengths arranged within the folded support strap footprint width and footprint length of the folded support strap footprint 80.

FIGS. 14A through 14D and FIGS. 15A through 15D shows representative views of the positioning of the support strap 40 (of the type shown in previous FIGs.) during the progression of sequential stages of a stowing operation of the movable exit hatch and stowing operation of the support strap within the movable exit hatch with the support strap 40 moving from an unfolded and deployed configuration into a folded and stowed configuration. According to present aspects, the movement of the movable exit hatch 29 from a deployed to a stowed position and/or from a stowed position to a deployed position can be accomplished manually or automatically.

FIG. 14A shows a partial exposed view of a movable exit hatch in a first stowage stage 140a, according to present aspects moving from a deployed (e.g., a fully extended or fully open position) to a stowed position by progressively closing the movable exit hatch. In first stowage stage 140a, a support strap first section 46 adjoins support strap second sections 142 and 144. In the first stowage stage 140a, support strap second section 142 is shown bending in a first direction as a closing force is imparted on the movable exit hatch.

FIG. 14B shows a second stowage stage 140b where the stowing operation continues to progress, and the support strap continues to be stowed within the movable exit hatch and the support strap is induced to fold along its length at the bending points or joints coincident with the location of the support strap second sections 142 and 144. In the second stowage stage 140b, support strap second section 142 is shown nearly fully bent in a first direction as a closing force is imparted on the movable exit hatch, with support strap second section 144 shown bending in a second bending direction that is opposite to the first bending direction as a closing force is imparted on the movable exit hatch. FIG. 14B shows a length of support strap being folded onto itself such that folded lengths of support strap contact one another along their folded lengths.

As shown in FIG. 14C, in the third stowage stage 140c, the support strap continues to fold upon itself along its length at the bending areas or joints made possible by the support strap second sections 142, 144, 146 that each have a bending stiffness that is less than the bending stiffness of the support strap first sections 46. As shown in FIG. 14C support strap second sections 142 and 144 bend in opposite directions sequentially (with respect to one another), such that support strap second section 142 bends in the first bending direction, and support strap second section 144 bends in the second bending direction, with support strap second section 146 beginning to bend in the first bending direction that is similar to the bending direction of support strap second section 142.

FIG. 14D shows the fourth stowage stage 140d with the support strap continuing to be folded upon itself in desired length with another support strap second section 148 in view, and with support strap second section 148 beginning to bend in alternating fashion with respect to support strap second section 146; in the same direction as support strap second section 144.

The stowage stage progression shown in FIGS. 14A through 14D continues and is shown in the progressive and sequential representative views shown in FIGS. 15A through 15D. As shown in FIG. 15A, a fifth stowage stage 140e shows support strap second section 148 bending further to induce and bring the support strap first sections 46 into contact with one another (e.g., overlap and/or fold upon one another along their lengths). As shown in FIG. 15A, as the movable exit hatch 29 is brought closer to the exit hatch support structure 26, the support strap continues to be folded into sections folded onto itself until the final sections of straps are folded. FIG. 15A further shows a support strap first section terminal segment 46a, that is the support strap first section located closest to the exit hatch support structure 26. FIG. 15A further shows a support strap second section 150 adjoining the support strap first section terminal segment 46a.

FIGS. 15B and 15C show a sixth stowage stage 140f and seventh stowage stage 140g, respectively, with both FIGS. 15B and 15C showing support strap second section 148 bending still further to induce and bring the support strap first sections 46 into contact with one another (e.g., overlap one another along their lengths). Through the stowage operation and progression depicted in the series of FIGs shown as FIGS. 14A-14D and 15A-15D the movable exit hatch 29 is brought closer to the exit hatch support structure 26, and the support strap continues to be folded into sections folded onto itself until the final sections of straps are folded. FIG. 15C further shows support strap second section 150 bending in the same direction as support strap second section 146, and in the alternate direction compared with the bending direction shown and shared by support strap second sections 148 and 144.

FIG. 15D shows an eighth stowage stage 140h where the support strap has been nearly completely compacted and folded onto itself in the multiple segments along its total unfolded length to form the folded support strap 41.

FIG. 16 is a partially exposed side view of the movable exit hatch 29 in a closed and stowed configuration and secured in place and in intimate contact with the exit hatch support structure 26. As shown in FIG. 16, folded support strap 41 is shown in its stowed and folded configuration with the total length of the support strap folded into strap segments in a repeatable and predetermined orientation that is configured to not interfere with any latching mechanism involved with securing the movable exit hatch to the exit hatch support structure. Present aspects further contemplate the stowing and folding of the support straps being induced, by, for example, the alternating folding of support strap segments, to occupy a predetermined folded support strap footprint within a stowed crew egress pathway exit assembly and according to present methods.

As mentioned herein, the support straps, according to present aspects, can comprise myriad materials and combinations of materials including, without limitation, one of more types of nylon, one of more types of natural fiber cloth or synthetic fiber cloth, one or more types of plastic, one or more types of metals, etc. so long as the support strap is afforded adjoining segments with varying bending stiffnesses so that the support strap can bend into segments and compress in length such that the overall total length of the unfolded support strap is folded into a stack having stacked segment lengths that are less than the overall length of the unfolded support strap. In addition, present aspects contemplate that the unfolded support strap (e.g., the support strap in the deployed/unfolded state) is rated to support weight of at least 500 lbs. In accordance with present aspects, materials of any type and in any combination of types, can be used to fabricate the presently disclosed support straps, with the proviso that the support straps possess a load rating of at least 500 lbs. In addition, the support straps according to present aspects comprise a tensile strength able to support a load weight of at least 500 lbs. While present aspects contemplate the incorporation of additional mechanisms in the crew egress pathway exit assembly (e.g. cables, hydraulic pistons, pneumatic pistons, etc.) in place to contribute to withstanding and even exceeding regulatory rated weight requirements (e.g., to support the weight of exiting crew members, etc.), present aspects contemplate that the incorporated support straps as provided can, entirely by themselves, reliably bear a regulatorily mandated weight support requirement that can be up to at least 500 lbs.

In certain present aspects, depending on the material selection for the support strap first sections and the support strap second sections, the thickness of the support strap along its length may have a substantially constant thickness (e.g., when support strap first sections are made from materials differing from support strap second sections, etc.). However, even if the thickness of the support strap first sections is substantially similar to or identical to the support strap second sections, present aspects contemplate that the bending stiffness of the support strap second sections will be less than the bending stiffness of the support strap first sections. In other present aspects, for example, where a nylon material is selected for the support strap first and second sections, with respect to the support strap first sections, a plurality of nylon material layers can be joined together (e.g., as a "patch" of additional nylon material that can be stitched, glued, otherwise adhered, etc. to form the support strap first section) to provide support strap first sections that have a greater bending stiffness and/or a greater bending stiffness value than do the support strap second sections. In such instances, and where the same material type is used to make the support strap first and second sections, the thickness of the support strap first sections can be greater than the thickness of the support strap second sections. Without being bound to any particular theory, in these aspects, the thicker support strap first sections can be configured to have a greater bending stiffnesses than the comparatively thinner support strap second sections.

FIGS. 17A and 17B show an illustrative support strap of the type shown in previous FIGs. herein where a material such as nylon (e.g., including a reinforced nylon, etc.) is used in the fabrication of the support straps 40 (e.g., nylon used both in the fabrication of support strap first sections and in the fabrication of the support strap second sections). FIG. 17A is an overhead plan view of an exemplary support strap 40 comprising support strap first sections 46 and support strap second sections 48, according to present aspects. Support strap first sections 46 have a bending stiffness and bending stiffness value that exceeds the bending stiffness and bending stiffness values of the support strap second sections 48. As shown in FIG. 17A, a stitching 47 is used at the support strap first sections to affix an additional material layer to make the support strap first section 46 that possess the heightened bending stiffness as compared to the support strap second sections 48 (e.g., shown in FIGS. 17A and 17B as having a single material layer, etc.) that can be induced to bend and serve as joints or bendable areas along the length of the support strap 40. As further shown in FIG. 17A, the length of the support strap first sections 46 is labeled as "$l_1$", with the length of the support strap second sections labeled as "$l_2$". Present aspects contemplate $l_1$ being the same as or different from $l_2$, as desired. Further present aspects contemplate the length $l_1$ being greater than $l_2$ to facilitate a proper compacting of the support strap into the folded or stowed support strap configuration. In addition, as stated herein, according to present aspects, and without being bound to any particular theory, the support straps are rated to withstand a load of at least 500 lbs., and achieving the load demands that are required can necessitate including support strap first sections that are significantly greater in length as compared to the length of the support strap second sections. As shown in FIG. 17A, further "specialty" segments such as the support strap first section terminal segment 46a can be included in the support strap and can have a segment length denoted as "$l_4$" that can differ from the value of length $l_1$. Further, as shown in FIG. 17A, support strap second sections may have the same or differing lengths. For example, as shown in FIG. 17A, support strap second sections can have varying lengths $l_2$ and/or $l_3$, etc.

FIG. 17B is a side view that can be cross-sectional side view of the support strap shown in FIG. 17A. As shown in FIG. 17A, dotted lines in the support strap first sections 46 indicate the presence of a plurality of material layers (e.g., as shown, three layers). While three (3) layers are shown as present in the support strap first sections 46, according to present aspects, any number or one or more layers can be used with the understanding that the bending stiffness value of the support strap first sections exceeds the bending stiffness value of the support strap second sections. When the same or similar material is used to fabricate both the support strap first and second section, according to present aspects, the support strap first sections can have a plurality of layers joined together to create a thickness shown in FIG. 17B as "d1" (e.g., a support strap first section diameter, d1) that is greater than the support strap second section "d2" (e.g., a support strap second section diameter, d2).

As shown in FIG. 17B, further "specialty" segments such as the support strap first section terminal segment can be included in the support strap and can have a segment diameter or thickness denoted as "d4", "d5" that can differ from the value of diameter or thickness d1. Further, as shown in FIG. 17B, support strap second sections may have the same or differing thicknesses, and can have a segment diameter or thickness denoted as "d3" that can differ from the value of support strap second section diameter or thickness d2, for example. As shown in FIG. 17B, the support strap ends can comprise a length of material that can be, for example, secured to form a loop once the material is stitched or adhered together. Such a loop located at a support strap first end and at a support strap second end can accommodate or otherwise house, for example, a pin or other fixture that can be inserted into the manufactured "loop", with the fixture then configured to engage a fitting that is in communication with the exit hatch support structure at a support strap first end, and with the movable exit hatch at a support structure second end, for example. While such "loops are not explicitly shown in FIG. 17B, according to present aspects the ends of the support strap shown are understood to be configured into the support strap first and second ends to engage securely and reliably with fitting of the types shown in FIGS. 18, 19A, 19B, and 19C described herein.

FIG. 17C shows an alternate aspect for the present support straps that differs from the aspects shown in FIGS. 17A and 17B. As shown in FIG. 17C, and in contrast to the support straps shown in FIGS. 17A and 17B, the support strap first sections 46 of support strap 40a shown in FIG. 17C comprise three layers of material stitched together as compared to the two layers of material shown stitched together in FIGS. 17A and 17B. In aircraft, overall weight remains a concern, as overall aircraft weight can impact fuel consumption, aircraft range, etc. Accordingly, the support strap 40a shown in FIG. 17C illustrates that a support strap first section can comprises more than two layers, and can incorporate any desired number of layers (e.g., including for example, 3, 4, 5, 6, 7, 8, 9, 10, or more layers of the same or differing materials, etc.), limited only by the practicality of expense and material density, etc.

The support straps disclosed herein, according to present aspects have a support strap first end fixedly attached or otherwise in communication with the exit hatch support structure, or attached or otherwise in communication with hardware, fixtures, etc. that is attached to the exit hatch support structure. The present support straps further comprise a support strap second end fixedly attached or otherwise in communication with the movable exit hatch or attached or otherwise in communication with hardware, fixtures, etc. that is attached to the movable exit hatch. For example, the attachment point to which the support strap is engaged can be any mechanical device suitable for the purpose of retaining the support strap securely and, together with the support strap the attachment point can be rated to bear (e.g., withstand without failure) a load of at least 500 lbs. The attachment point can comprise, for example and without limitation, a bracket assembly that is itself fastened to the movable exit hatch and/or the exit hatch support structure. Alternatively, the attachment point can be an integral fitting molded into the movable exit hatch and/or the exit hatch support structure.

FIG. 18 is a partial view of the exit hatch support structure 26 showing the support strap first end engaging a non-limiting fixture 180 (where fixture 180 can be, for example, a bracket, bracket assembly, etc.) fixedly attached to the exit hatch support structure 26, with the fixture 180 configured to secure the support strap 40 at the support strap first end 42 to the exit hatch support structure 26. For exemplary purposes, fixture 180 further comprises fasteners 184 to secure fixture 180 to the exit hatch support structure 26. As shown in FIG. 18, fixture 180 further comprises a pin 182 that can be, for example, a pin that can freely rotate. According to present aspects, when the support strap first end is configured to form a secured loop, pin 182 can be inserted into the loop formed at the support strap first end, for example. FIG. 18 further illustrates aspects of the support strap shown in previous FIGs. herein, including the support strap first section 46, support strap second section 48 and the stitching 47 that can be present in the support strap first section when a plurality of material layers are joined to form the support strap first section, and with the support strap first section having a bending stiffness and/or bending stiffness value that exceeds the bending stiffness and/or bending stiffness value of the support strap second section.

FIGS. 19A, 19B, and 19C illustrate further present aspects, including placement of a rigid or semi-rigid spacer proximate to the support strap first end. As shown in FIGS. 19A and 19B a spacer 190 can be secured to the exit hatch support structure, for example, and positioned proximate to the support strap first end 192. According to present aspects, and as shown in FIGS. 19A and 19B, spacer 190 provides additional reinforcement and directional assistance for the positioning of the final length of a support strap 40 during stowage of the movable exit hatch and commensurate stowage and desired final folding of the support strap 40. By positioning spacer 190 adjacent an inner surface of support strap first end 192, for example, as an amount of the force for closing or stowing the movable exit hatch translates along the support strap, placement of spacer 190 as shown in FIGS. 19A and 19B counters any errant inward motion of the terminal support strap second section 48a that could result in an undesired directional bend and that could further result in stacking the final support strap segment stacking "crookedly" (e.g., in an irregularly stacked orientation other than the orderly stacking of the support strap where support stack segments fold over upon each other substantially coincidentally lengthwise, etc.). Such undesired folding of the terminal sections of the support strap could have the undesired result of a support stack folding beyond a desired folded support strap footprint. Irregular stacking of the support strap, including stacking of the support strap folded segments that extends outside of a folded support strap footprint could interfere with the stowing and deploying operation, otherwise frustrate a reliable and repeatable stowing and deploying operation including, for example interfering with securely latching and/or reliably unlatching certain mechanisms, etc.

As further shown in FIG. 19B, as the stowing operation continues and the movable exit hatch 29 closes upwardly and toward the exit hatch support structure 26, the support strap first end terminal segment 192 is restricted from moving inwardly via contact with the spacer 190. The spacer can be made from any rigid or semi-rigid material that will not damage the support strap. Such exemplary materials suitable for the spacer 190 can include, without limitation, plastics, rubbers, foamed solids, open cell foamed materials, etc. As shown in FIG. 19B during the final phases of a stowing operation, as the support strap first end terminal segment 192 (that is shown adjacent the spacer 190) is fortified or otherwise reinforced to restrict or eliminate significant inward movement, the terminal support strap second section 48a bends in the desired and predetermined direction (e.g., bending opposite and alternately with respect to the immediately previous support strap second section, and insuring the successful completion of the support strap folding protocol into the desired folded and stacked support strap orientation and folded support strap footprint, etc.).

If desired, spacer 190 can be moved proximate to the inner surface of the support strap first end terminal segment 192 only when the necessary reinforcement is required at a certain and predetermined point in the stowage protocol. FIG. 19C illustrates a present aspect where, once the spacer 190 has insured that the terminal support strap second section 48a will bend in the desired direction, spacer 190 can be manually or automatically retracted away or otherwise moved from a position directly adjacent the support strap first end terminal segment 192 to a position remote from support strap first end terminal segment 192. Such movement of the spacer may be necessitated to insure that the exit hatch support structure 26 and the movable exit hatch 29 achieve the intimate contact required to latch together or otherwise securely engage together for the successful completion of a hatch stowing protocol.

FIG. 20 is a flow chart outlining methods according to present aspects. As shown in FIG. 20, a method 2100 comprises providing 2102 a crew egress pathway in an aircraft, with the crew egress pathway including a crew egress pathway exit, and with the crew egress pathway exit comprising an exit hatch support structure. The crew egress pathway exit further comprises a movable exit hatch, with the movable exit hatch in movable communication with the movable exit hatch support structure. The method further includes providing 2104 at least one support strap in communication with the exit hatch support structure, with the at least one support strap further in communication with the movable exit hatch, with the support strap including a support strap first end and a support strap second end, and with the support strap first end fixedly attached to the exit hatch support structure. The support strap second end can be fixedly attached to the movable exit hatch, with at least one support strap comprising a plurality of support strap first sections, at least two of the plurality of the support strap first sections adjoining an adjacent support strap second section, and with the support strap second section interposed between two of the plurality of support strap first sections. The method further includes moving 2106 the movable exit hatch from a stowed position to a deployed position, with the movable exit hatch in movable communication with the exit hatch support structure, with the movable exit hatch configured to move through a range of motion from a stowed position with the movable exit hatch in a closed position and in substantial contact with the exit hatch support structure to a deployed position with the movable exit hatch in an open position with the movable exit hatch partially disengaged from the exit hatch support structure. The method further includes expanding 2108 the at least one support strap from a folded stowed state in the stowed position to an unfolded deployed state in the deployed position.

In a further aspect, a method 2100 further can comprise applying a force 2110 to the movable exit hatch in the deployed position, with the force configured to move the movable exit hatch from the deployed state to the stowed position, directing 2112 the at least one support strap from the unfolded deployed state to the folded stowed state, and folding 2114 the at least one support strap at predetermined positions along the length of the at least one support strap, with the support strap second section including a second bending stiffness, and the plurality of support strap first sections each including a first bending stiffness. According to present aspects, method 2100 can comprise either deploying a movable exit hatch (e.g., moving 2106 the movable exit hatch from a stowed position to a deployed position, with the movable exit hatch in movable communication with the exit hatch support structure, with the movable exit hatch configured to move through a range of motion from a stowed position with the movable exit hatch in a closed position and in substantial contact with the exit hatch support structure to a deployed position with the movable exit hatch in an open position with the movable exit hatch partially disengaged from the exit hatch support structure; stowing a deployed movable exit hatch; and/or both deploying and then stowing (e.g., "re-stowing" from a deployed state) the movable exit hatch.

In another aspect, the crew egress pathway originates at a crew rest area, with the crew egress pathway exit terminating within an aircraft passenger cabin.

In another aspect, the second bending stiffness is less than the first bending stiffness.

FIG. 21 is a flowchart outlining another method according to present aspects. As shown in FIG. 21 the method 2200 includes providing 2102 a crew egress pathway in an aircraft, with the crew egress pathway including a crew egress pathway exit, and with the crew egress pathway exit comprising an exit hatch support structure. The crew egress pathway exit further comprises a movable exit hatch, with the movable exit hatch in movable communication with the movable exit hatch support structure. The method further includes providing 2104 at least one support strap in communication with the exit hatch support structure, with the at least one support strap further in communication with the movable exit hatch, with the support strap including a support strap first end and a support strap second end, and with the support strap first end fixedly attached to the exit hatch support structure. The support strap second end can be fixedly attached to the movable exit hatch, with at least one support strap comprising a plurality of support strap first sections, at least two of the plurality of the support strap first sections adjoining an adjacent support strap second section, and with the support strap second section interposed between two of the plurality of support strap first sections. The method further includes moving 2106 the movable exit hatch from a stowed position to a deployed position, with the movable exit hatch in movable communication with the exit hatch support structure, with the movable exit hatch configured to move through a range of motion from a stowed position with the movable exit hatch in a closed position and in substantial contact with the exit hatch support structure to a deployed position with the movable exit hatch in an open position with the movable exit hatch partially disengaged from the exit hatch support structure. The method further includes expanding 2108 the at least one support strap from a folded stowed state in the stowed position to an unfolded deployed state in the deployed position, applying a force

2110 to the movable exit hatch in the deployed position, with the force configured to move the movable exit hatch from the deployed state to the stowed position, directing 2112 the at least one support strap from the unfolded deployed state to the folded stowed state, and folding 2114 the at least one support strap at predetermined positions along the length of the at least one support strap, with the support strap second section including a second bending stiffness, and the plurality of support strap first sections each including a first bending stiffness. The method 2200 further included defining 2202 a flexible joint at the support strap second section in the at least one support strap, said flexible joint operable about an axis of rotation.

FIG. 22 is a flowchart outlining a further method according to present aspects. As shown in FIG. 22, a method 2300 includes providing 2102 a crew egress pathway in an aircraft, with the crew egress pathway including a crew egress pathway exit, and with the crew egress pathway exit comprising an exit hatch support structure. The crew egress pathway exit further comprises a movable exit hatch, with the movable exit hatch in movable communication with the movable exit hatch support structure. The method further includes providing 2104 at least one support strap in communication with the exit hatch support structure, with the at least one support strap further in communication with the movable exit hatch, with the support strap including a support strap first end and a support strap second end, and with the support strap first end fixedly attached to the exit hatch support structure. The support strap second end can be fixedly attached to the movable exit hatch, with at least one support strap comprising a plurality of support strap first sections, at least two of the plurality of the support strap first sections adjoining an adjacent support strap second section, and with the support strap second section interposed between two of the plurality of support strap first sections. The method further includes moving 2106 the movable exit hatch from a stowed position to a deployed position, with the movable exit hatch in movable communication with the exit hatch support structure, with the movable exit hatch configured to move through a range of motion from a stowed position with the movable exit hatch in a closed position and in substantial contact with the exit hatch support structure to a deployed position with the movable exit hatch in an open position with the movable exit hatch partially disengaged from the exit hatch support structure. The method further includes expanding 2108 the at least one support strap from a folded stowed state in the stowed position to an unfolded deployed state in the deployed position, applying a force 2110 to the movable exit hatch in the deployed position, with the force configured to move the movable exit hatch from the deployed state to the stowed position, directing 2112 the at least one support strap from the unfolded deployed state to the folded stowed state, and folding 2114 the at least one support strap at predetermined positions along the length of the at least one support strap, with the support strap second section including a second bending stiffness, and the plurality of support strap first sections each including a first bending stiffness. The method 2300 further included defining 2202 a flexible joint at the support strap second section in the at least one support strap, said flexible joint operable about an axis of rotation, providing 2302 a plurality of flexible joints along a length of the at least one support strap, and inducing 2304 sequential flexible joints to each rotate about an opposite axis of rotation, with the opposite axis of rotation observed relative to each prior and subsequent flexible joint. The parts referred to in the descriptions of methods outlined in FIGS. 20, 21, 22 can be the parts described in more detail in the FIGs. presented herein, with the descriptions of such parts also presented herein.

Present aspects illustrate crew members exiting from a crew rest area via a crew egress pathway through a movable exit hatch for purposes that can include evacuation from a crew area as well as, for example gaining entry in a passenger area to provide passenger assistance. In various present aspects the term "crew members" can include not only pilots and flight attendants, but can also include designated security and other safety personnel for whom quick deployment into a passenger cabin would be advantageous to passenger, crew, and aircraft safety, including while the aircraft is in flight, or is in a location at, or away from a gate while the aircraft is on the ground.

The present aspects can, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A crew egress pathway exit comprising:
a crew egress pathway exit assembly, said crew egress pathway exit assembly comprising: an exit hatch support structure, said exit hatch support structure positioned at a crew egress pathway exit assembly, said crew egress pathway exit assembly in communication with a crew egress pathway; a movable exit hatch, said movable exit hatch in movable communication with the exit hatch support structure, a one-piece support strap in communication with the exit hatch support structure, said one-piece support strap further in communication with said movable exit hatch, said one-piece support strap comprising:
a support strap first end and a support strap second end, said support strap first end fixedly attached to the exit hatch support structure, said support strap second end fixedly attached to the movable exit hatch, said one-piece support strap comprising a plurality of support strap first sections, said plurality of support strap first sections comprising a first bending stiffness, at least two of the plurality of the support strap first sections adjoining an adjacent support strap second section, said support strap second section comprising a second bending stiffness, said second bending stiffness less than the first bending stiffness, said support strap second section interposed between two of the plurality of support strap first sections, said adjacent support strap second section configured to bend at the support strap second section as a flexible joint along a length of the one-piece support strap; wherein said movable exit hatch is in movable communication with the exit hatch support structure, said movable exit hatch configured to move through a range of motion from a stowed position to a deployed position with the movable exit hatch at least partially disengaged from the exit hatch support structure in the deployed position, with the movable exit hatch in substantial contact with the exit hatch support structure in the stowed position, and with the one-piece support strap in a stacked orientation in the stowed position;
wherein during moving the movable exit hatch from the deployed position to the stowed position the one-piece support strap is configured to form a folded one-piece support strap, said folded one-piece support strap configured to return into the stacked orientation and to occupy a predetermined folded one-piece support strap footprint in the stacked orientation;

wherein during moving the movable exit hatch from the stowed position to the deployed position the one-piece support strap is further configured to unfold at predetermined positions along the length of the one-piece support strap to form an unfolded one-piece support strap configured to unfold from the stacked orientation;

wherein the one-piece support strap comprises a plurality of flexible joints along a length of the one-piece support strap, said plurality of flexible joints configured to each rotate about an opposite axis of rotation relative to each prior and subsequent flexible joint, with the one-piece support strap configured to repeatedly fold upon itself into the stacked orientation; and wherein the plurality of the support strap first sections each comprise a support strap first section diameter thickness, and said support strap second section comprises a support strap second section diameter thickness that differs from support strap first section diameter thickness.

2. The crew egress pathway exit of claim 1, wherein the one-piece support strap is configured to fold and form a folded one-piece support strap, said folded support strap configured to remain within the predetermined folded support strap footprint, said folded one-piece support strap further configured to facilitate intimate contact of a movable exit hatch perimeter with the exit hatch support structure in the closed position.

3. The crew egress pathway exit of claim 1, wherein the plurality of support strap first sections are made from a material comprising at least one of: nylon, cloth, plastic, metal, and combinations thereof.

4. The crew egress pathway exit of claim 1, wherein the support strap second section is made from a material comprising at least one of: nylon, cloth, plastic, metal, and combinations thereof.

5. The crew egress pathway exit of claim 1, wherein said one-piece support strap in the deployed position comprises a tensile strength sufficient to support a weight up to 500 lbs.

6. The crew egress pathway exit of claim 1, wherein a support strap second section defines a flexible joint in the one-piece support strap, said flexible joint operable about an axis of rotation.

7. An aircraft comprising:
an aircraft cabin, said aircraft cabin comprising:
a crew egress pathway exit assembly, said crew egress pathway exit assembly in communication with a crew egress pathway, said crew egress pathway exit assembly comprising:
an exit hatch support structure; a movable exit hatch, said movable exit hatch in movable communication with the movable exit hatch support structure, a one-piece support strap, said one-piece support strap in communication with the exit hatch support structure, said one-piece support strap further in communication with the movable exit hatch, said one-piece support strap comprising:
a support strap first end and a support strap second end, said support strap first end fixedly attached to the exit hatch support structure, said support strap second end fixedly attached to the movable exit hatch, said one-piece support strap comprising a plurality of support strap first sections, said plurality of support strap first sections comprising a first bending stiffness, at least two of the plurality of the support strap first sections adjoining an adjacent support strap second section, said support strap second section comprising a second bending stiffness, said second bending stiffness less than the first bending stiffness, said support strap second section interposed between two of the plurality of support strap first sections, said adjacent support strap second section configured to bend at the support strap second section as a flexible joint along a length of the one-piece support strap;

wherein said movable exit hatch is in movable communication with the exit hatch support structure, said movable exit hatch configured to move through a range of motion from a stowed position with the movable exit hatch in a closed position with the movable exit hatch in substantial contact with the exit hatch support structure in the stowed position to a deployed position with the movable exit hatch in an open position with the movable exit hatch at least partially disengaged from the exit hatch support structure in the deployed position;

wherein during moving the movable exit hatch from the deployed position to the stowed position the one-piece support strap is configured to fold to form a folded one-piece support strap, with the folded one-piece support strap configured to return to a predetermined folded one-piece support strap footprint; wherein during moving the movable exit hatch from the stowed position to the deployed position the one-piece support strap is further configured to fold at predetermined positions along the length of the one-piece support strap; and wherein the plurality of the support strap first sections each comprise a support strap first section diameter thickness, and said support strap second section comprises a support strap second section diameter thickness that differs from support strap first section diameter thickness.

8. The aircraft of claim 7, wherein the plurality of support strap first sections is made from a material comprising at least one of: nylon, cloth, plastic, metal, and combinations thereof, and wherein the support strap second section is made from a material comprising at least one of: nylon, cloth, plastic, metal, and combinations thereof.

9. The aircraft of claim 7, wherein the movable exit hatch is configured to open into an aircraft passenger cabin when the movable exit hatch is in the open position.

10. The aircraft of claim 7, wherein said one-piece support strap in the deployed position comprises a tensile strength sufficient to support a weight up to 500 lbs.

11. A method comprising:
providing a crew egress pathway in an aircraft, said crew egress pathway comprising:
a crew egress pathway exit assembly, said crew egress pathway exit assembly comprising: an exit hatch support structure, said exit hatch support structure positioned at said crew egress pathway exit assembly, said crew egress pathway exit assembly in communication with said crew egress pathway, said crew egress pathway exit assembly further comprising:
a movable exit hatch, said movable exit hatch in movable communication with the exit hatch support structure;
providing a one-piece support strap in communication with the exit hatch support structure, said one-piece support strap further in communication with the movable exit hatch, said one-piece support strap comprising:
a support strap first end and a support strap second end, said support strap first end fixedly attached to the exit hatch support structure, said support strap second end fixedly attached to the movable exit hatch, said one-piece support strap comprising a plurality of support strap first sections comprising a support strap first section bending stiffness, at least two of the plurality of the support strap first sections adjoining an adjacent support strap second section comprising a support strap second section bending stiffness, said support strap second section interposed between two of the plurality of support strap first sections, said adjacent support strap second section configured to bend as a flexible joint at the support strap second section along a length of the one-piece support strap into a stacked configuration;

moving the movable exit hatch from a stowed position to a deployed position, said movable exit hatch in movable communication with the exit hatch support structure, said movable exit hatch configured to move through a range of motion from a stowed position with the movable exit hatch in a closed position and in substantial contact with the exit hatch support structure to a deployed position with the movable exit hatch in an open position with the movable exit hatch at least partially disengaged from the exit hatch support structure;

expanding the one-piece support strap from a folded one-piece support strap stacked orientation in the stowed position to an unfolded one-piece support strap in the deployed position, said folded one-piece support strap stacked orientation comprising alternating folded one-piece support strap segments folded into the stacked configuration; and wherein the plurality of the support strap first sections each comprise a support strap first section diameter thickness, and said support strap second section comprises a support strap second section diameter thickness that differs from support strap first section diameter thickness.

12. The method of claim 11, the method further comprising:

applying a force to the movable exit hatch in the deployed position, said force configured to move the movable exit hatch from the deployed position to the stowed position;

directing the unfolded one-piece support strap from the deployed position to the folded one-piece support strap stacked orientation in the stowed position; and folding the one-piece support strap at predetermined positions along the length of the one-piece support strap and at the support strap second section to form the stacked orientation.

13. The method of claim 11, wherein said crew egress pathway originates at a crew rest area, said crew egress pathway exit assembly configured to terminate within an aircraft passenger cabin.

14. The method of claim 11, the method further comprising:

defining a flexible joint at the support strap second section in the one-piece support strap, said flexible joint operable about an axis of rotation.

15. The method of claim 14, the method further comprising:

providing a plurality of flexible joints along a length of the one-piece support strap at the support strap second section; and inducing the plurality of flexible joints to rotate about an opposite axis of rotation relative to each prior and subsequent flexible joint.

16. The crew egress pathway exit of claim 1, wherein the support strap second section comprises a second bending stiffness and the plurality of support strap first sections each comprise a first bending stiffness with the first bending stiffness differing from the second bending stiffness.

17. The aircraft of claim 7, wherein the support strap second section comprises a second bending stiffness and the plurality of support strap first sections each comprise a first bending stiffness with the first bending stiffness differing from the second bending stiffness.

* * * * *